United States Patent
Chiang et al.

(10) Patent No.: US 9,411,129 B2
(45) Date of Patent: Aug. 9, 2016

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Yita Chiang, Central Taiwan Science Park (TW); Jia-Sin Jhang, Central Taiwan Science Park (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/508,563

(22) Filed: Oct. 7, 2014

(65) Prior Publication Data

US 2016/0011397 A1    Jan. 14, 2016

(30) Foreign Application Priority Data

Jul. 11, 2014 (CN) .......................... 2014 1 0331107

(51) Int. Cl.
  *G02B 9/34* (2006.01)
  *G02B 13/00* (2006.01)
  *H04N 5/225* (2006.01)

(52) U.S. Cl.
  CPC .............. *G02B 13/004* (2013.01); *G02B 9/34* (2013.01); *H04N 5/2252* (2013.01); *H04N 5/2254* (2013.01)

(58) Field of Classification Search
  CPC ....... G02B 13/004; G02B 9/34; G02B 13/002
  USPC .......................... 359/713–715, 754, 771–773
  See application file for complete search history.

(56) References Cited

U.S. PATENT DOCUMENTS

| | | | |
|---|---|---|---|
| 7,453,654 B2 | 11/2008 | Shinohara | |
| 7,777,972 B1 | 8/2010 | Chen et al. | |
| 7,957,079 B2 | 6/2011 | Tang | |
| 8,179,470 B2 | 5/2012 | Chen et al. | |
| 8,294,997 B2 | 10/2012 | Tang et al. | |
| 8,395,691 B2 | 3/2013 | Tang et al. | |
| 8,879,168 B1* | 11/2014 | Hsu | G02B 13/004 359/715 |
| 8,896,937 B1* | 11/2014 | Hsueh | G02B 13/004 359/715 |
| 8,908,291 B1* | 12/2014 | Chung | G02B 13/004 359/715 |
| 2011/0075271 A1* | 3/2011 | Tang | G02B 13/004 359/715 |
| 2012/0229695 A1* | 9/2012 | Iba | G02B 9/34 348/360 |
| 2013/0265652 A1* | 10/2013 | An | G02B 13/18 359/715 |
| 2013/0335588 A1* | 12/2013 | Matsusaka | G02B 3/00 348/220.1 |
| 2014/0022651 A1* | 1/2014 | Chen | G02B 3/00 359/772 |
| 2014/0184895 A1* | 7/2014 | Ahn | G02B 13/004 348/369 |

(Continued)

FOREIGN PATENT DOCUMENTS

| | | |
|---|---|---|
| CN | 1369724 | 9/2002 |
| CN | 103076670 | 5/2013 |

(Continued)

OTHER PUBLICATIONS

"Office Action of China Counterpart Application", issued on Mar. 3, 2016, p. 1-p. 6.

*Primary Examiner* — Bumsuk Won
*Assistant Examiner* — William R Alexander
(74) *Attorney, Agent, or Firm* — Jianq Chyun IP Office

(57) ABSTRACT

An imaging lens includes an aperture stop and first to fourth lens elements arranged from an object side to an image side of the imaging lens. Through designs of surfaces of the lens elements and relevant optical parameters, a short system length of the imaging lens may be achieved while maintaining good optical performance.

17 Claims, 39 Drawing Sheets

(56) References Cited

U.S. PATENT DOCUMENTS

2014/0185151 A1* 7/2014 Chen .................... G02B 13/004
 359/773
2015/0124149 A1* 5/2015 Tang ........................ G02B 9/34
 348/335

FOREIGN PATENT DOCUMENTS

| | | |
|---|---|---|
| TW | 201317616 A1 | 5/2013 |
| TW | 201329496 A1 | 7/2013 |
| TW | 201329497 A1 | 7/2013 |
| TW | 201346322 A | 11/2013 |

* cited by examiner

| system focal length =2.333mm, half field-of-view =37.033°, F-number =2.219, system length =3.341mm ||||||
|---|---|---|---|---|---|
| lens element | surface | radius of curvature | thickness | refractive index | Abbe number | focal length |
| object | | ∞ | 10000000000 | | | |
| aperture stop 2 | | ∞ | -0.015 | | | |
| first lens element 3 | object-side surface 31 | 1.499181 | 0.65 | 1.544102 | 56.11429 | 2.225922 |
| | image-side surface 32 | -5.43352 | 0.1 | | | |
| second lens element 4 | object-side surface 41 | -3.4424 | 0.3 | 1.64283 | 22.43732 | -5.73872 |
| | image-side surface 42 | -47.9945 | 0.26 | | | |
| third lens element 5 | object-side surface 51 | -0.72073 | 0.359 | 1.544102 | 56.11429 | 2.579011 |
| | image-side surface 52 | -0.56057 | 0.06 | | | |
| fourth lens element 6 | object-side surface 61 | 1.12726 | 0.4095 | 1.53113 | 55.74414 | -3.77463 |
| | image-side surface 62 | 0.631171 | 0.3 | | | |
| optical filter 7 | object-side surface 71 | ∞ | 0.3 | 1.5168 | 64.16734 | |
| | image-side surface 72 | ∞ | 0.602 | | | |
| image plane 100 | | ∞ | | | | |

FIG.3

| surface | K | a4 | a6 | a8 | a10 | a12 | a14 | a16 |
|---|---|---|---|---|---|---|---|---|
| 31 | 0.436482 | -0.054397929 | -0.37299 | 2.956961 | -12.513 | 15.83223 | 0 | 0 |
| 32 | -72.5751 | -0.350105712 | -2.6745 | 10.67293 | -20.9513 | 18.29736 | 0 | 0 |
| 41 | 8.773983 | -0.398262407 | -2.23222 | 5.819633 | -2.55305 | 0 | 0 | 0 |
| 42 | -1056.6 | 0.098227229 | -0.47152 | -0.14387 | 0.594472 | 0 | 0 | 0 |
| 51 | -3.50934 | 0.203821185 | -0.74273 | 2.507953 | -6.64554 | 2.141258 | 15.67147 | -14.7984 |
| 52 | -2.59782 | -0.347237433 | 0.599543 | -0.83928 | 0.542918 | 1.328501 | 0.522961 | -1.76021 |
| 61 | -0.38106 | -0.633499371 | 0.459363 | -0.19137 | -0.02905 | 0.041651 | -0.00394 | -0.00249 |
| 62 | -5.22835 | -0.195542513 | 0.142848 | -0.07861 | 0.027546 | -0.00891 | 0.002387 | -0.0003 |

FIG.4

| system focal length =2.196mm, half field-of-view =38.832°, F-number =2.208, system length =3.112mm |||||||
|---|---|---|---|---|---|---|
| lens element | surface | radius of curvature | thickness | refractive index | Abbe number | focal length |
| object | | ∞ | 10000000000 | | | |
| aperture stop 2 | | ∞ | -0.015 | | | |
| first lens element 3 | object-side surface 31 | 1.540924 | 0.52 | 1.544102 | 56.11429 | 2.214049 |
| | image-side surface 32 | -4.93887 | 0.1 | | | |
| second lens element 4 | object-side surface 41 | -3.80456 | 0.2 | 1.64283 | 22.43732 | -5.98784 |
| | image-side surface 42 | -200.636 | 0.26 | | | |
| third lens element 5 | object-side surface 51 | -0.84888 | 0.3765 | 1.544102 | 56.11429 | 2.139478 |
| | image-side surface 52 | -0.5686 | 0.06 | | | |
| fourth lens element 6 | object-side surface 61 | 1.123645 | 0.3432 | 1.53113 | 55.74414 | -3.07727 |
| | image-side surface 62 | 0.59596 | 0.3 | | | |
| optical filter 7 | object-side surface 71 | ∞ | 0.35 | 1.5168 | 64.16734 | |
| | image-side surface 72 | ∞ | 0.602 | | | |
| image plane 100 | | ∞ | | | | |

FIG.7

| surface | K | a4 | a6 | a8 | a10 | a12 | a14 | a16 |
|---|---|---|---|---|---|---|---|---|
| 31 | -0.14085 | -0.085886593 | -0.37861 | 2.714786 | -13.4116 | 14.74606 | 0 | 0 |
| 32 | -0.88023 | -0.359613018 | -2.63551 | 10.372 | -21.5794 | 18.32595 | 0 | 0 |
| 41 | 5.992607 | -0.396093391 | -2.28254 | 5.834107 | -2.55665 | 0 | 0 | 0 |
| 42 | -1.2E+18 | 0.052804316 | -0.45121 | -0.13253 | 0.60841 | 0 | 0 | 0 |
| 51 | -3.01062 | 0.240874405 | -0.65818 | 2.597354 | -6.59138 | 2.125824 | 15.49513 | -14.9373 |
| 52 | -2.74121 | -0.381394621 | 0.654513 | -0.73914 | 0.635147 | 1.371288 | 0.504811 | -1.93617 |
| 61 | -0.37472 | -0.634527798 | 0.432267 | -0.18442 | -0.02549 | 0.041147 | -0.00463 | -0.00222 |
| 62 | -4.77687 | -0.204132065 | 0.145322 | -0.08035 | 0.027648 | -0.00866 | 0.002443 | -0.00034 |

FIG.8 system focal length =2.294mm, half field-of-view =37.552°, F-number =2.202, system length =3.350mm

| lens element | surface | radius of curvature | thickness | refractive index | Abbe number | focal length |
|---|---|---|---|---|---|---|
| object | | ∞ | 1000000000 | | | |
| aperture stop 2 | | ∞ | -0.015 | | | |
| first lens element 3 | object-side surface 31 | 1.721701 | 0.5 | 1.544102 | 56.11429 | 2.427393 |
| | image-side surface 32 | -5.16442 | 0.1 | | | |
| second lens element 4 | object-side surface 41 | -9.25578 | 0.32 | 1.64283 | 22.43732 | -7.13813 |
| | image-side surface 42 | 9.369639 | 0.4 | | | |
| third lens element 5 | object-side surface 51 | -0.81791 | 0.4 | 1.544102 | 56.11429 | 2.110143 |
| | image-side surface 52 | -0.56092 | 0.06 | | | |
| fourth lens element 6 | object-side surface 61 | 1.166507 | 0.4 | 1.53113 | 55.74414 | -2.91415 |
| | image-side surface 62 | 0.586714 | 0.3 | | | |
| optical filter 7 | object-side surface 71 | ∞ | 0.35 | 1.5168 | 64.16734 | |
| | image-side surface 72 | ∞ | 0.52 | | | |
| image plane 100 | | ∞ | | | | |

FIG.11

| surface | K | a4 | a6 | a8 | a10 | a12 | a14 | a16 |
|---|---|---|---|---|---|---|---|---|
| 31 | -0.30819 | -0.090485827 | -0.42591 | 2.793594 | -13.1963 | 14.45857 | 0 | 0.00E+00 |
| 32 | -27.5732 | -0.353527784 | -2.87131 | 10.87893 | -20.2665 | 15.20189 | 0.00E+00 | 0 |
| 41 | -0.2309 | -0.382304525 | -2.28693 | 5.692644 | -2.63643 | 0 | 0 | 0 |
| 42 | -205.099 | -0.042700617 | -0.38117 | -0.09428 | 0.602281 | 0 | 0 | 0 |
| 51 | -1.9398 | 0.036981435 | -0.74626 | 2.754165 | -6.4247 | 2.104335 | 15.30711 | -14.8536 |
| 52 | -2.3825 | -0.475298617 | 0.656604 | -0.88095 | 0.416152 | 1.253084 | 0.605865 | -1.5702 |
| 61 | -0.40169 | -0.571552377 | 0.442645 | -0.17217 | -0.03 | 0.037124 | -0.00523 | -0.00113 |
| 62 | -4.31888 | -0.223755813 | 0.189072 | -0.09113 | 0.02664 | -0.00827 | 0.00251 | -0.00036 |

FIG.12

| lens element | surface | radius of curvature | thickness | refractive index | Abbe number | focal length |
|---|---|---|---|---|---|---|
| object | | ∞ | 1000000000 | | | |
| aperture stop 2 | | ∞ | -0.06 | | | |
| first lens element 3 | object-side surface 31 | 1.512626 | 0.485569718 | 1.544102 | 56.11429 | 2.400216 |
| | image-side surface 32 | -8.68934 | 0.211430117 | | | |
| second lens element 4 | object-side surface 41 | -2.96066 | 0.253282841 | 1.64283 | 22.43732 | -4.68697 |
| | image-side surface 42 | -122.088 | 0.194623349 | | | |
| third lens element 5 | object-side surface 51 | -1.07691 | 0.453093124 | 1.544102 | 56.11429 | 1.997046 |
| | image-side surface 52 | -0.62227 | 0.125500523 | | | |
| fourth lens element 6 | object-side surface 61 | 1.199138 | 0.373160281 | 1.53113 | 55.74414 | -3.09259 |
| | image-side surface 62 | 0.618997 | 0.4 | | | |
| optical filter 7 | object-side surface 71 | ∞ | 0.3 | 1.5168 | 64.16734 | |
| | image-side surface 72 | ∞ | 0.501641914 | | | |
| image plane 100 | | ∞ | | | | | system focal length =2.308mm, half field-of-view =37.465°, F-number =2.213, system length =3.299mm

FIG.15

| surface | K | a4 | a6 | a8 | a10 | a12 | a14 | a16 | a18 |
|---|---|---|---|---|---|---|---|---|---|
| 31 | 0 | 0.015574046 | -1.82582 | 14.92934 | -75.7179 | 185.5681 | -189.347 | 0 | 0 |
| 32 | 0 | -0.363377046 | -1.599 | 7.908602 | -33.9933 | 75.78868 | -65.1495 | -0.52977 | 0 |
| 41 | -14.8361 | -1.001611784 | 0.922818 | -14.5609 | 65.76655 | -135.207 | 244.872 | -363.375 | 226.7528 |
| 42 | 0 | -0.263592408 | 1.016169 | -9.92318 | 35.77168 | -68.5077 | 76.72158 | -42.6607 | 5.341406 |
| 51 | 0.549993 | 0.825294004 | 0.08929 | -1.84972 | -0.30982 | 10.57298 | -15.6849 | 7.07399 | 0 |
| 52 | -2.82878 | -0.305241725 | 0.684641 | -0.25158 | -0.40805 | 2.556649 | -3.96181 | 1.860349 | 0 |
| 61 | -0.30279 | -0.514876399 | 0.347577 | -0.15468 | -0.12547 | 0.292267 | -0.23749 | 0.092384 | -0.01452 |
| 62 | -4.20852 | -0.211374386 | 0.213415 | -0.21298 | 0.153105 | -0.07128 | 0.019438 | -0.00266 | 0.000112 |

FIG.16

| system focal length =2.242mm, half field-of-view =38.252°, F-number =2.215, system length =3.202mm |||||||
|---|---|---|---|---|---|---|
| lens element | surface | radius of curvature | thickness | refractive index | Abbe number | focal length |
| object | | ∞ | 100000000000 | | | |
| aperture stop 2 | | ∞ | -0.06 | | | |
| first lens element 3 | object-side surface 31 | 1.467255 | 0.471871759 | 1.544102 | 56.11429 | 2.463927 |
| | image-side surface 32 | -14.3291 | 0.136800761 | | | |
| second lens element 4 | object-side surface 41 | -87568.7 | 0.238536671 | 1.64283 | 22.43732 | -6.342 |
| | image-side surface 42 | 4.109307 | 0.189253938 | | | |
| third lens element 5 | object-side surface 51 | -1.37277 | 0.573358794 | 1.544102 | 56.11429 | 1.470227 |
| | image-side surface 52 | -0.58121 | 0.059165469 | | | |
| fourth lens element 6 | object-side surface 61 | 2.056173 | 0.402179369 | 1.53113 | 55.74414 | -1.76831 |
| | image-side surface 62 | 0.602223 | 0.4 | | | |
| optical filter 7 | object-side surface 71 | ∞ | 0.3 | 1.5168 | 64.16734 | |
| | image-side surface 72 | ∞ | 0.431405092 | | | |
| image plane 100 | | ∞ | | | | |

FIG.19

| surface | K | a4 | a6 | a8 | a10 | a12 | a14 | a16 | a18 |
|---|---|---|---|---|---|---|---|---|---|
| 31 | 0 | -0.01822941 | -0.69874 | 2.063195 | -6.78807 | 7.83792 | -15.2818 | 0 | 0 |
| 32 | 0 | -0.4716679359 | -1.55981 | 5.792312 | -20.5741 | 43.913 | -31.0567 | -16.4167 | 0 |
| 41 | -1.4E-06 | -0.818020033 | -0.79448 | -7.7563 | 37.32463 | -21.6786 | -43.125 | -15.6176 | 98.46236 |
| 42 | 0 | -0.060990766 | -1.33062 | 2.064942 | -0.30867 | -1.51909 | 17.02002 | -57.3022 | 50.88984 |
| 51 | 0.919671 | 0.54258333 | 0.110618 | 0.225186 | -6.71998 | 23.84911 | -32.9802 | 13.75944 | 0 |
| 52 | -3.88168 | -0.863220384 | 2.985612 | -6.83034 | 9.441667 | -0.44683 | -9.88474 | 5.808746 | 0 |
| 61 | 0.29393 | -0.536172942 | 0.566575 | -0.45098 | 0.217727 | 0.052743 | -0.15983 | 0.095082 | -0.02031 |
| 62 | -5.12145 | -0.313027535 | 0.404751 | -0.4344 | 0.312684 | -0.13373 | 0.02559 | 0.001179 | -0.00087 |

FIG.20 system focal length =2.307mm, half field-of-view =37.485°, F-number =2.213, system length =3.225mm

| lens element | surface | radius of curvature | thickness | refractive index | Abbe number | focal length |
|---|---|---|---|---|---|---|
| object | | ∞ | 1000000000 | | | |
| aperture stop 2 | | ∞ | -0.06 | | | |
| first lens element 3 | object-side surface 31 | 1.415946 | 0.475213266 | 1.544102 | 56.11429 | 2.460479 |
| | image-side surface 32 | -23.0715 | 0.165858589 | | | |
| second lens element 4 | object-side surface 41 | -21.741 | 0.252073836 | 1.64283 | 22.43732 | -6.57771 |
| | image-side surface 42 | 5.32513 | 0.190215986 | | | |
| third lens element 5 | object-side surface 51 | -1.13427 | 0.474842653 | 1.544102 | 56.11429 | 1.909291 |
| | image-side surface 52 | -0.62349 | 0.059749624 | | | |
| fourth lens element 6 | object-side surface 61 | 2.041555 | 0.495723006 | 1.53113 | 55.74414 | -2.39145 |
| | image-side surface 62 | 0.71836 | 0.4 | | | |
| optical filter 7 | object-side surface 71 | ∞ | 0.3 | 1.5168 | 64.16734 | |
| | image-side surface 72 | ∞ | 0.411275327 | | | |
| image plane 100 | | ∞ | | | | |

FIG.23

| surface | K | a4 | a6 | a8 | a10 | a12 | a14 | a16 | a18 |
|---|---|---|---|---|---|---|---|---|---|
| 31 | 0 | -0.034161741 | -0.67149 | 1.973887 | -6.9539 | 8.170275 | -12.2436 | 0 | 0 |
| 32 | 0 | -0.474037584 | -1.42026 | 5.684691 | -20.9895 | 44.24215 | -28.1867 | -19.8499 | 0 |
| 41 | -29.1241 | -0.816874588 | -0.70903 | -7.21725 | 37.66092 | -22.4175 | -44.5393 | -15.9346 | 88.63814 |
| 42 | 0 | -0.051763826 | -1.27221 | 1.833713 | -0.17185 | -0.40009 | 18.75025 | -57.48 | 43.9269 |
| 51 | 0.637118 | 0.7427455 | -0.21264 | 0.157412 | -6.07291 | 24.7998 | -32.9296 | 12.03857 | 0 |
| 52 | -3.76212 | -0.877291629 | 3.009803 | -6.76053 | 9.436996 | -0.59993 | -10.0296 | 6.070968 | 0 |
| 61 | 0.244135 | -0.525674726 | 0.562179 | -0.46402 | 0.218504 | 0.056714 | -0.15795 | 0.095041 | -0.0213 |
| 62 | -5.44654 | -0.292805019 | 0.386676 | -0.42756 | 0.31284 | -0.13448 | 0.025491 | 0.001248 | -0.00086 |

| \multicolumn{6}{l}{system focal length =2.307mm, half field-of-view =37.466°, F-number =2.221, system length =3.273mm} |
| --- | --- | --- | --- | --- | --- |
| lens element | surface | radius of curvature | thickness | refractive index | Abbe number | focal length |
| object | | ∞ | 10000000000 | | | |
| aperture stop 2 | | ∞ | -0.06 | | | |
| first lens element 3 | object-side surface 31 | 1.441144 | 0.482070824 | 1.544102 | 56.11429 | 2.365827 |
| | image-side surface 32 | -10.9769 | 0.169674795 | | | |
| second lens element 4 | object-side surface 41 | -5.1823 | 0.240575403 | 1.64283 | 22.43732 | -6.16224 |
| | image-side surface 42 | 17.70991 | 0.194782699 | | | |
| third lens element 5 | object-side surface 51 | -0.92293 | 0.4131996 | 1.544102 | 56.11429 | 2.871493 |
| | image-side surface 52 | -0.67277 | 0.059717167 | | | |
| fourth lens element 6 | object-side surface 61 | 1.639196 | 0.594886801 | 1.53113 | 55.74414 | -4.50049 |
| | image-side surface 62 | 0.850833 | 0.4 | | | |
| optical filter 7 | object-side surface 71 | ∞ | 0.3 | 1.5168 | 64.16734 | |
| | image-side surface 72 | ∞ | 0.41742572 | | | |
| image plane 100 | | ∞ | | | | |

| surface | K | a4 | a6 | a8 | a10 | a12 | a14 | a16 | a18 |
|---|---|---|---|---|---|---|---|---|---|
| 31 | 0 | -0.014592527 | -0.75566 | 2.143948 | -6.88101 | 6.802383 | -11.4506 | 0 | 0 |
| 32 | 0 | -0.442935054 | -1.52535 | 5.756374 | -20.9495 | 43.91031 | -28.4127 | -17.0855 | 0 |
| 41 | -32.5333 | -0.809451509 | -0.76636 | -7.1421 | 37.95242 | -22.1027 | -44.0329 | -14.7138 | 82.47185 |
| 42 | 0 | -0.007577122 | -1.30077 | 1.624614 | -0.25981 | 0.071534 | 19.83425 | -56.9717 | 40.63291 |
| 51 | 0.25747 | 0.959589053 | -0.38441 | 0.115415 | -5.74706 | 25.2228 | -32.8797 | 11.79854 | 0 |
| 52 | -3.9563 | -0.937243146 | 3.110605 | -6.67273 | 9.371466 | -0.7536 | -10.1351 | 6.261896 | 0 |
| 61 | -0.00713 | -0.535497727 | 0.566561 | -0.46815 | 0.215148 | 0.055496 | -0.15762 | 0.095754 | -0.02113 |
| 62 | -5.12061 | -0.276414749 | 0.379262 | -0.42562 | 0.313817 | -0.13459 | 0.025326 | 0.001198 | -0.00082 |

FIG.28 system focal length =2.307mm, half field-of-view =37.488°, F-number =2.207, system length =3.186mm

| lens element | surface | radius of curvature | thickness | refractive index | Abbe number | focal length |
|---|---|---|---|---|---|---|
| object | | ∞ | 1000000000 | | | |
| aperture stop 2 | | ∞ | -0.06 | | | |
| first lens element 3 | object-side surface 31 | 1.377162 | 0.486648955 | 1.544102 | 56.11429 | 2.389824 |
| | image-side surface 32 | -21.703 | 0.153753122 | | | |
| second lens element 4 | object-side surface 41 | -5.90989 | 0.239879401 | 1.64283 | 22.43732 | -5.71073 |
| | image-side surface 42 | 10.05348 | 0.237952079 | | | |
| third lens element 5 | object-side surface 51 | -1.10696 | 0.443225874 | 1.544102 | 56.11429 | 1.719141 |
| | image-side surface 52 | -0.57973 | 0.060685432 | | | |
| fourth lens element 6 | object-side surface 61 | 1.628926 | 0.407226045 | 1.53113 | 55.74414 | -2.13509 |
| | image-side surface 62 | 0.611643 | 0.4 | | | |
| optical filter 7 | object-side surface 71 | ∞ | 0.3 | 1.5168 | 64.16734 | |
| | image-side surface 72 | ∞ | 0.456023305 | | | |
| image plane 100 | | ∞ | | | | |

FIG.31

| surface | K | a4 | a6 | a8 | a10 | a12 | a14 | a16 | a18 |
|---|---|---|---|---|---|---|---|---|---|
| 31 | 0 | -0.02133039 | -0.63691 | 1.85839 | -6.92688 | 10.52655 | -17.9326 | 0 | 0 |
| 32 | 0 | -0.461667992 | -1.51134 | 5.361182 | -19.9257 | 45.41694 | -31.6207 | -20.0416 | 0 |
| 41 | 5.672929 | -0.8161203 | -0.46668 | -6.93528 | 37.02789 | -23.7554 | -43.8743 | -10.1752 | 83.58072 |
| 42 | 0 | -0.133769722 | -1.03521 | 2.000899 | -0.36815 | -1.16464 | 18.27653 | -56.1133 | 45.68557 |
| 51 | 0.631079 | 0.621840958 | -0.35587 | 0.401432 | -5.81953 | 24.49492 | -33.3188 | 11.76834 | 0 |
| 52 | -3.60651 | -0.825276644 | 2.917482 | -6.89569 | 9.395272 | -0.41183 | -9.77361 | 5.800802 | 0 |
| 61 | -0.09103 | -0.547806612 | 0.560858 | -0.45116 | 0.219042 | 0.052308 | -0.16196 | 0.094007 | -0.01881 |
| 62 | -5.05126 | -0.295526535 | 0.393842 | -0.43284 | 0.315928 | -0.13419 | 0.0251 | 0.001088 | -0.00079 |

FIG.32

| relationship | first preferred embodiment | second preferred embodiment | third preferred embodiment | fourth preferred embodiment |
|---|---|---|---|---|
| T1 | 0.650 | 0.520 | 0.500 | 0.486 |
| G12 | 0.100 | 0.100 | 0.100 | 0.211 |
| T2 | 0.300 | 0.200 | 0.320 | 0.253 |
| G23 | 0.260 | 0.260 | 0.400 | 0.195 |
| T3 | 0.359 | 0.377 | 0.400 | 0.453 |
| G34 | 0.060 | 0.060 | 0.060 | 0.126 |
| T4 | 0.410 | 0.343 | 0.400 | 0.373 |
| G4F | 0.300 | 0.300 | 0.300 | 0.400 |
| TF | 0.300 | 0.350 | 0.350 | 0.300 |
| GFP | 0.602 | 0.602 | 0.520 | 0.502 |
| EFL | 2.333 | 2.196 | 2.294 | 2.308 |
| ALT | 1.719 | 1.440 | 1.620 | 1.565 |
| Gaa | 0.420 | 0.420 | 0.560 | 0.532 |
| BFL | 1.202 | 1.252 | 1.170 | 1.202 |
| TTL | 3.341 | 3.112 | 3.350 | 3.299 |

FIG.34

| relationship | fifth preferred embodiment | sixth preferred embodiment | seventh preferred embodiment | eighth preferred embodiment |
|---|---|---|---|---|
| T1 | 0.472 | 0.475 | 0.482 | 0.487 |
| G12 | 0.137 | 0.166 | 0.170 | 0.154 |
| T2 | 0.239 | 0.252 | 0.241 | 0.240 |
| G23 | 0.189 | 0.190 | 0.195 | 0.238 |
| T3 | 0.573 | 0.475 | 0.413 | 0.443 |
| G34 | 0.059 | 0.060 | 0.060 | 0.061 |
| T4 | 0.402 | 0.496 | 0.595 | 0.407 |
| G4F | 0.400 | 0.400 | 0.400 | 0.400 |
| TF | 0.300 | 0.300 | 0.300 | 0.300 |
| GFP | 0.431 | 0.411 | 0.417 | 0.456 |
| EFL | 2.242 | 2.307 | 2.307 | 2.307 |
| ALT | 1.686 | 1.698 | 1.731 | 1.577 |
| Gaa | 0.385 | 0.416 | 0.425 | 0.453 |
| BFL | 1.131 | 1.111 | 1.117 | 1.156 |
| TTL | 3.202 | 3.225 | 3.273 | 3.186 |

FIG.35

| relationship | first preferred embodiment | second preferred embodiment | third preferred embodiment | fourth preferred embodiment |
| --- | --- | --- | --- | --- |
| EFL/T2 | 7.777 | 10.980 | 7.169 | 9.123 |
| ALT/G23 | 6.612 | 5.538 | 4.050 | 8.026 |
| Gaa/T2 | 1.400 | 2.100 | 1.750 | 2.103 |
| ALT/T2 | 5.730 | 7.200 | 5.063 | 6.186 |
| T4/G23 | 1.577 | 1.319 | 1.000 | 1.913 |
| Gaa/G23 | 1.615 | 1.615 | 1.400 | 2.728 |
| BFL/T2 | 4.007 | 6.260 | 3.656 | 4.751 |
| T3/(G12+G34) | 2.244 | 2.356 | 2.500 | 1.344 |
| EFL/T3 | 6.499 | 5.825 | 5.735 | 5.095 |
| T3/G23 | 1.381 | 1.450 | 1.000 | 2.323 |
| Gaa/(G12+G34) | 2.625 | 2.625 | 3.500 | 1.579 |
| ALT/T4 | 4.193 | 4.198 | 4.050 | 4.196 |
| TTL/T3 | 9.306 | 8.255 | 8.375 | 7.283 |
| T1/G23 | 2.500 | 2.000 | 1.250 | 2.492 |
| ALT/T3 | 4.788 | 3.820 | 4.050 | 3.455 |
| BFL/T3 | 3.348 | 3.321 | 2.925 | 2.653 |
| TTL/T1 | 5.140 | 5.985 | 6.700 | 6.788 |
| TTL/T4 | 8.149 | 9.073 | 8.375 | 8.845 |

FIG.36

| relationship | fifth preferred embodiment | sixth preferred embodiment | seventh preferred embodiment | eighth preferred embodiment |
| --- | --- | --- | --- | --- |
| EFL/T2 | 9.381 | 9.155 | 9.573 | 9.613 |
| ALT/G23 | 8.921 | 8.937 | 8.877 | 6.626 |
| Gaa/T2 | 1.611 | 1.651 | 1.763 | 1.888 |
| ALT/T2 | 7.054 | 6.738 | 7.183 | 6.571 |
| T4/G23 | 2.127 | 2.611 | 3.051 | 1.710 |
| Gaa/G23 | 2.037 | 2.189 | 2.179 | 1.903 |
| BFL/T2 | 4.732 | 4.409 | 4.635 | 4.817 |
| T3/(G12+G34) | 2.923 | 2.102 | 1.796 | 2.060 |
| EFL/T3 | 3.913 | 4.857 | 5.586 | 5.208 |
| T3/G23 | 3.032 | 2.500 | 2.118 | 1.861 |
| Gaa/(G12+G34) | 1.964 | 1.841 | 1.848 | 2.107 |
| ALT/T4 | 4.194 | 3.423 | 2.909 | 3.875 |
| TTL/T3 | 5.588 | 6.789 | 7.925 | 7.192 |
| T1/G23 | 2.497 | 2.500 | 2.472 | 2.046 |
| ALT/T3 | 2.942 | 3.575 | 4.191 | 3.560 |
| BFL/T3 | 1.974 | 2.339 | 2.705 | 2.609 |
| TTL/T1 | 6.784 | 6.789 | 6.790 | 6.542 |
| TTL/T4 | 7.965 | 6.502 | 5.501 | 7.828 |

FIG.37

IMAGING LENS, AND ELECTRONIC APPARATUS INCLUDING THE SAME

CROSS-REFERENCE TO RELATED APPLICATION

This application claims priority to Chinese Application No. 201410331107.4, filed on Jul. 11, 2014.

FIELD OF THE INVENTION

The present invention relates to an imaging lens and an electronic apparatus including the same.

BACKGROUND OF THE INVENTION

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance. Image quality and size are two of the most important characteristics for an imaging lens.

Taiwanese patent No. I254140 discloses a conventional imaging lens that includes four lens elements and having a F-number of 4.0. However, the amount of light entering such imaging lens is insufficient to obtain a satisfactory imaging quality and the system length of such imaging lens is up to 12 mm, which disfavors reducing the thickness of portable electronic devices such as mobile phones with a slim profile.

Therefore, technical difficulties of a miniaturized imaging lens are higher than those of traditional imaging lenses. Producing an imaging lens that meets requirements of consumer electronic products with satisfactory optical performance is always a goal in the industry.

SUMMARY OF THE INVENTION

An object of the present invention is to provide an imaging lens having a shorter overall length while maintaining good optical performance.

According to one aspect of the present invention, an imaging lens includes an aperture stop, a first lens element, a second lens element, a third lens element, and a fourth lens element arranged in order from an object side to an image side along an optical axis of the imaging lens. Each of the first lens element, the second lens element, the third lens element, and the fourth lens element has a refractive power, an object-side surface facing toward the object side, and an image-side surface facing toward the image side.

The first lens element has a positive refractive power, and the image-side surface of the first lens element has a convex portion in a vicinity of the optical axis and a convex portion in a vicinity of a periphery of the first lens element. The second lens element has a negative refractive power, and the object-side surface of the second lens element has a concave portion in a vicinity of the optical axis and a concave portion in a vicinity of a periphery of the second lens element. The third lens element has a positive refractive power, the object-side surface of the third lens element has a concave portion in a vicinity of the optical axis and a concave portion in a vicinity of a periphery of the third lens element, and the image-side surface of the third lens element has a convex portion in a vicinity of the optical axis. The fourth lens element has a negative refractive power and is made of a plastic material. The object-side surface of the fourth lens element has a convex portion in a vicinity of the optical axis, and the image-side surface of the fourth lens element has a convex portion in a vicinity of a periphery of the fourth lens element.

The imaging lens satisfies $6 \leq EFL/T2 \leq 11$; $4 \leq ALT/G23 \leq 18$; $1.4 \leq Gaa/T2 \leq 2.11$; $5 \leq ALT/T2 \leq 7.2$; and $T4/G23 \geq 1$, where EFL represents a system effective focal length of the imaging lens, T2 represents a thickness of the second lens element at the optical axis, T4 represents a thickness of the fourth lens element at the optical axis, ALT represents a sum of thicknesses of the first lens element, the second lens element, the third lens element, and the fourth lens element at the optical axis, Gaa represents a sum of three air gap lengths among the first lens element, the second lens element, the third lens element, and the fourth lens element, and G23 represents the air gap length between the second lens element and the third lens element at the optical axis.

The imaging lens does not include any lens element with refractive power other than the first lens element, the second lens element, the third lens element, and the fourth lens element.

Another object of the present invention is to provide an electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the embodiments with reference to the accompanying drawings, of which:

FIG. 3 shows values of some optical data corresponding to the imaging lens of the first embodiment;

FIG. 4 shows values of some aspherical coefficients corresponding to the imaging lens of the first embodiment;

FIG. 7 shows values of some optical data corresponding to the imaging lens of the second embodiment;

FIG. 8 shows values of some aspherical coefficients corresponding to the imaging lens of the second embodiment;

FIG. 11 shows values of some optical data corresponding to the imaging lens of the third embodiment;

FIG. 12 shows values of some aspherical coefficients corresponding to the imaging lens of the third embodiment;

FIG. 15 shows values of some optical data corresponding to the imaging lens of the fourth embodiment;

FIG. 16 shows values of some aspherical coefficients corresponding to the imaging lens of the fourth embodiment;

FIG. 19 shows values of some optical data corresponding to the imaging lens of the fifth embodiment;

FIG. 20 shows values of some aspherical coefficients corresponding to the imaging lens of the fifth embodiment;

FIG. 23 shows values of some optical data corresponding to the imaging lens of the sixth embodiment;

FIG. 24 shows values of some aspherical coefficients corresponding to the imaging lens of the sixth embodiment;

FIG. 27 shows values of some optical data corresponding to the imaging lens of the seventh embodiment;

FIG. 28 shows values of some aspherical coefficients corresponding to the imaging lens of the seventh embodiment;

FIG. 31 shows values of some optical data corresponding to the imaging lens of the eighth embodiment;

FIG. 32 shows values of some aspherical coefficients corresponding to the imaging lens of the eighth embodiment;

FIGS. 34 to 37 are tables each listing values of relationships among some lens parameters corresponding to the imaging lenses of the first to eight embodiments;

DETAILED DESCRIPTION OF THE EMBODIMENTS

Figure 1:
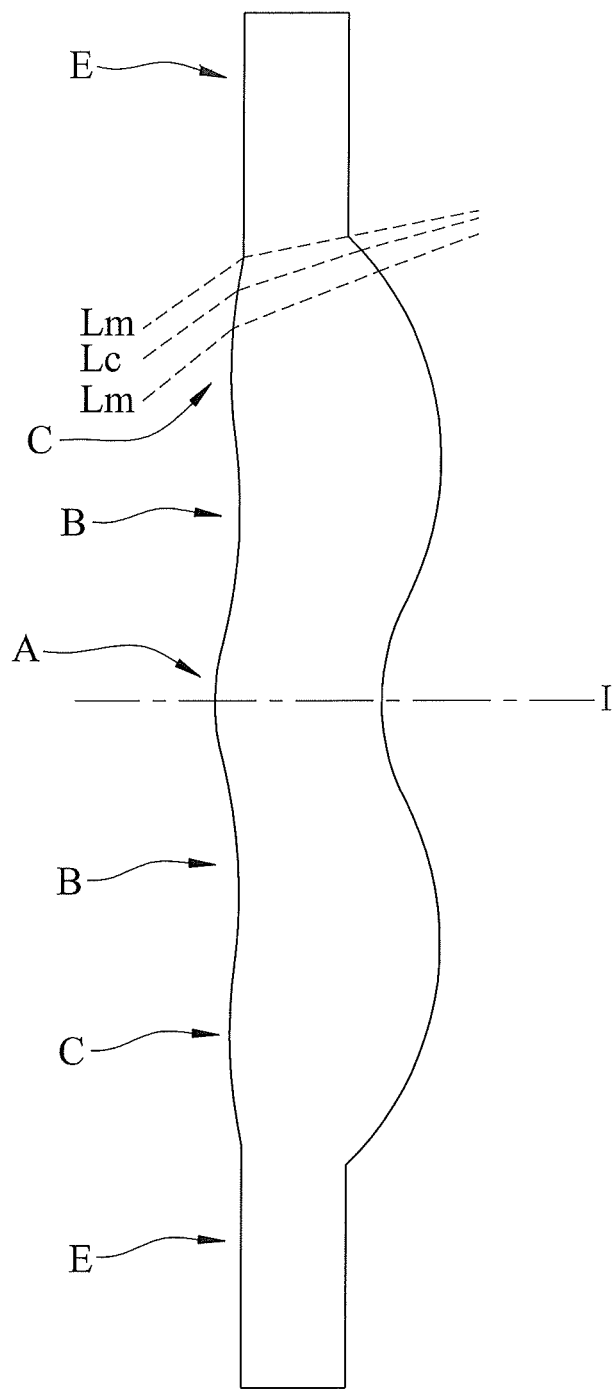
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
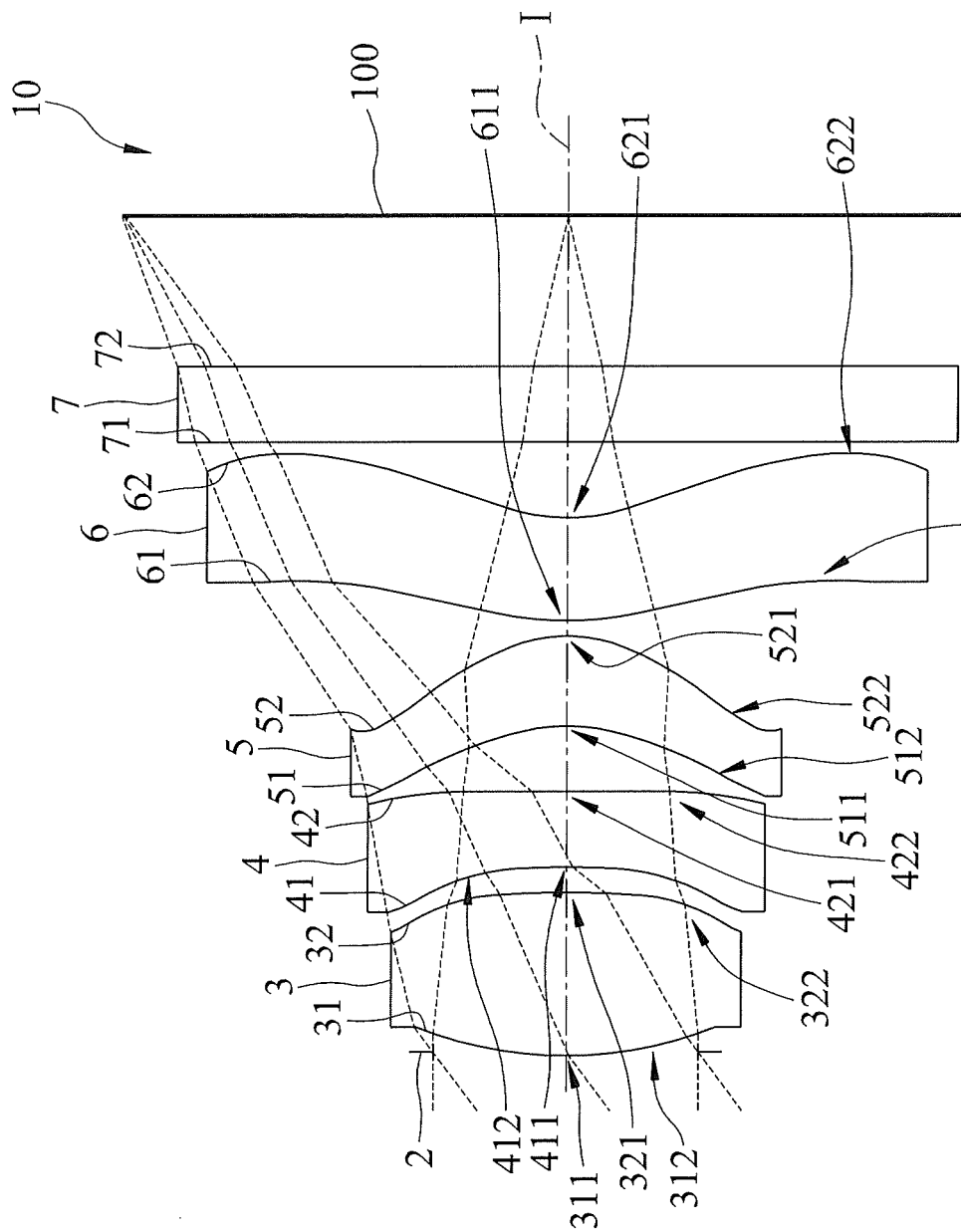
FIG. 2 is a schematic diagram that illustrates the first embodiment of an imaging lens according to the present invention.

Referring to FIG. 2, the first embodiment of an imaging lens 10 according to the present invention includes an aperture stop 2, a first lens element 3, a second lens element 4, a third lens element 5, a fourth lens element 6, and an optical filter 7 arranged in the given order along an optical axis (I) from an object side to an image side. The optical filter 7 is an infrared cut filter for selectively absorbing infrared light to thereby reduce imperfection of images formed at an image plane 100.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 100. Each of the object-side surfaces 31, 41, 51, 61 and the image-side surfaces 32, 42, 52, 62 is aspherical, and has a center point coinciding with the optical axis (I).

The lens elements 3-6 are made of a plastic material in this embodiment, and at least one of the lens elements 3-5 may be made of other materials in other embodiments. In addition, each of the lens elements 3-6 has a refractive power.

In the first embodiment, which is depicted in FIG. 2, the first lens element 3 has a positive refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 is a convex surface that has a convex portion 321 in a vicinity of the optical axis (I), and a convex portion 322 in a vicinity of the periphery of the first lens element 3.

The second lens element 4 has a negative refractive power. The object-side surface 41 of the second lens element 4 is a concave surface that has a concave portion 411 in a vicinity of the optical axis (I), and a concave portion 412 in a vicinity of a periphery of the second lens element 4. The image-side surface 42 of the second lens element 4 is a convex surface that has a convex portion 421 in a vicinity of the optical axis (I), and a convex portion 422 in a vicinity of the periphery of the second lens element 4.

The third lens element 5 has a positive refractive power. The object-side surface 51 of the third lens element 5 is a concave surface that has a concave portion 511 in a vicinity of the optical axis (I), and a concave portion 512 in a vicinity of a periphery of the third lens element 5. The image-side surface 52 of the third lens element 5 has a convex portion 521 in a vicinity of the optical axis (I), and a concave portion 522 in a vicinity of the periphery of the third lens element 5.

The fourth lens element 6 has a negative refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

In the first embodiment, the imaging lens 10 does not include any lens element with refractive power other than the aforesaid lens elements 3-6.

Shown in FIG. 3 is a table that lists values of some optical parameters corresponding to the surfaces 31-71, 32-72 of the first embodiment. The imaging lens 10 has an overall system effective focal length (EFL) of 2.333 mm, a half field-of-view (HFOV) of 37.033°, an F-number of 2.219, and a system length of 3.341 mm. The system length refers to a distance between the object-side surface 31 of the first lens element 3 and the image plane 100 at the optical axis (I).

In this embodiment, each of the object-side surfaces 31-61 and the image-side surfaces 32-62 is aspherical, and satisfies the relationship of $$Z(Y) = \frac{Y^2}{R} \Bigg/ \left(1 + \sqrt{1 - (1+K)\frac{Y^2}{R^2}}\right) + \sum_{i=1}^{n} a_{2i} \times Y^{2i} \quad (1)$$

where:

Y represents a perpendicular distance between an arbitrary point on an aspherical surface and the optical axis (I);

Z represents a depth of the aspherical surface, which is defined as a perpendicular distance between the arbitrary point on the aspherical surface that is spaced apart from the optical axis (I) by a distance Y, and a tangent plane at a vertex of the aspherical surface at the optical axis (I);

R represents a radius of curvature of the aspherical surface;

K represents a conic constant; and $a_{2i}$ represents a $2i^{th}$ aspherical coefficient.

Shown in FIG. 4 is a table that lists values of some aspherical coefficients of the aforementioned relationship (1) corresponding to the first embodiment. Note that in FIG. 4, the row under "31" represents aspherical coefficients of the object-side surface 31 of the first lens element 3 and the values listed in the other rows correspond to other surfaces of the lens elements 3-6.

Relationships among some of the lens parameters corresponding to the first embodiment are listed in columns of FIGS. 34 and 36 corresponding to the first embodiment, where:

T1 represents the thickness of the first lens element 3 at the optical axis (I);

T2 represents the thickness of the second lens element 4 at the optical axis (I);

T3 represents the thickness of the third lens element 5 at the optical axis (I);

T4 represents the thickness of the fourth lens element 6 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

Gaa represents a sum of the three air gap lengths among the first lens element 3, the second lens element 4, the third lens element 5, and the fourth lens element 6 at the optical axis (I), i.e., the sum of G12, G23, and G34;

ALT represents a sum of the thicknesses of the first lens element 3, the second lens element 4, the third lens element 5, and the fourth lens element 6 at the optical axis (I), i.e., a sum of T1, T2, T3, and T4;

TTL represents a distance at the optical axis (I) between the object-side surface 31 of the first lens element 3 and the image plane 100 at the image side;

BFL represents a distance at the optical axis (I) between the image-side surface 62 of the fourth lens element 6 and the image plane 100; and EFL represents a system effective focal length of the imaging lens 10.

In addition, some referenced terminologies are defined herein, where:

G4F represents an air gap length between the fourth lens element 6 and the optical filter 7 at the optical axis (I);

TF represents a thickness of the optical filter 7 at the optical axis (I); and

GFP represents an air gap length between the optical filter 7 and the image plane 100 at the optical axis (I).

FIGS. 5(a) to 5(d) respectively show simulation results corresponding to longitudinal spherical aberration, sagittal astigmatism aberration, tangential astigmatism aberration, and distortion aberration of the first embodiment. In each of the simulation results, curves corresponding respectively to wavelengths of 470 nm, 555 nm, and 650 nm are shown.

Figure 5:
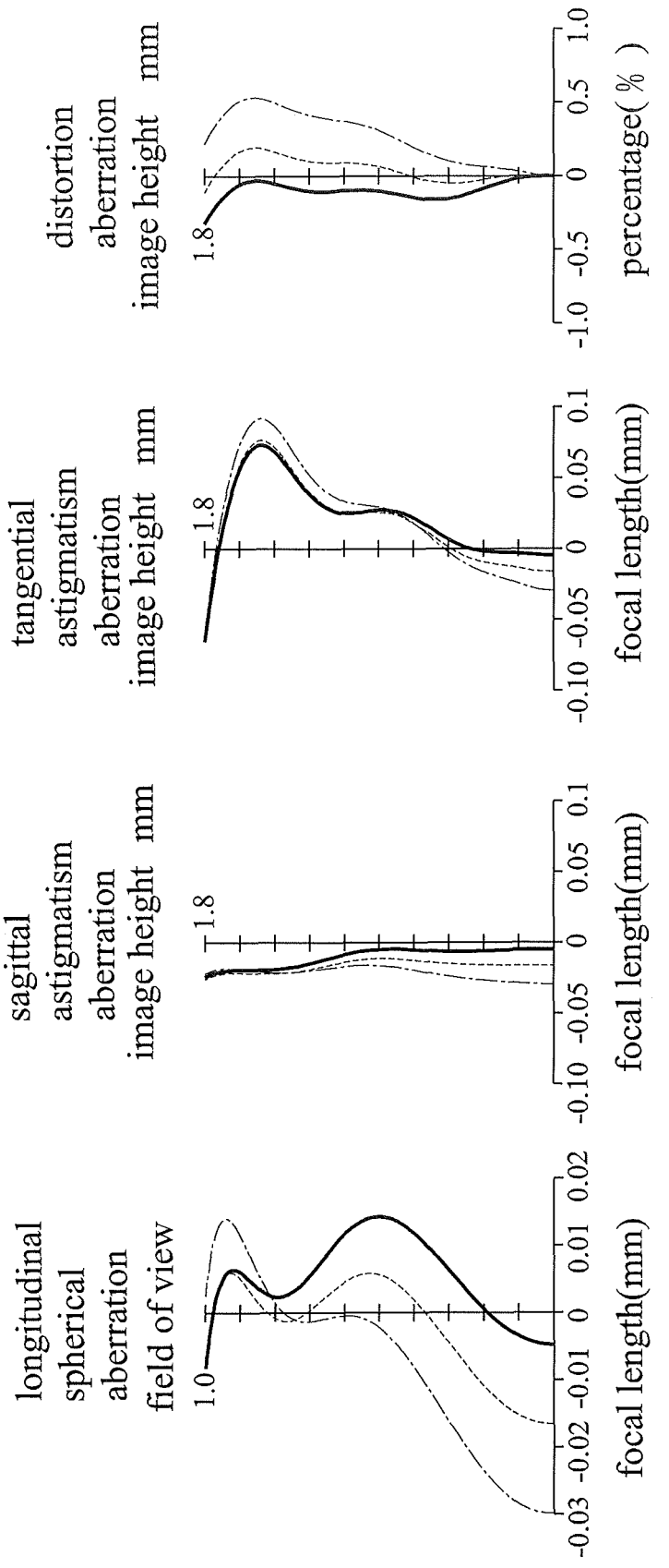
FIGS. 5(a) to 5(d) show different optical characteristics of the imaging lens of the first embodiment.

It can be understood from FIG. 5(a) that, since each of the curves corresponding to longitudinal spherical aberration has a focal length at each field of view (indicated by the vertical axis) that falls within the range of ±0.03 mm, the first embodiment is able to achieve a relatively low spherical aberration at each of the wavelengths. Furthermore, since a deviation in focal length among the curves at each of the wavelengths of 470 nm, 555 nm, and 650 nm does not exceed the range of 0.2 mm, the first embodiment has a relatively low chromatic aberration.

It can be understood from FIGS. 5(b) and 5(c) that, since each of the curves falls within the range of ±0.1 mm of focal length, the first embodiment has a relatively low optical aberration.

Moreover, as shown in FIG. 5(d), since each of the curves corresponding to distortion aberration falls within the range of ±0.8%, the first embodiment is able to meet requirements in imaging quality of most optical systems.

In view of the above, even with the system length reduced down to 3.341 mm, the imaging lens 10 of the first embodiment is still able to achieve a relatively good optical performance.

Figure 6:
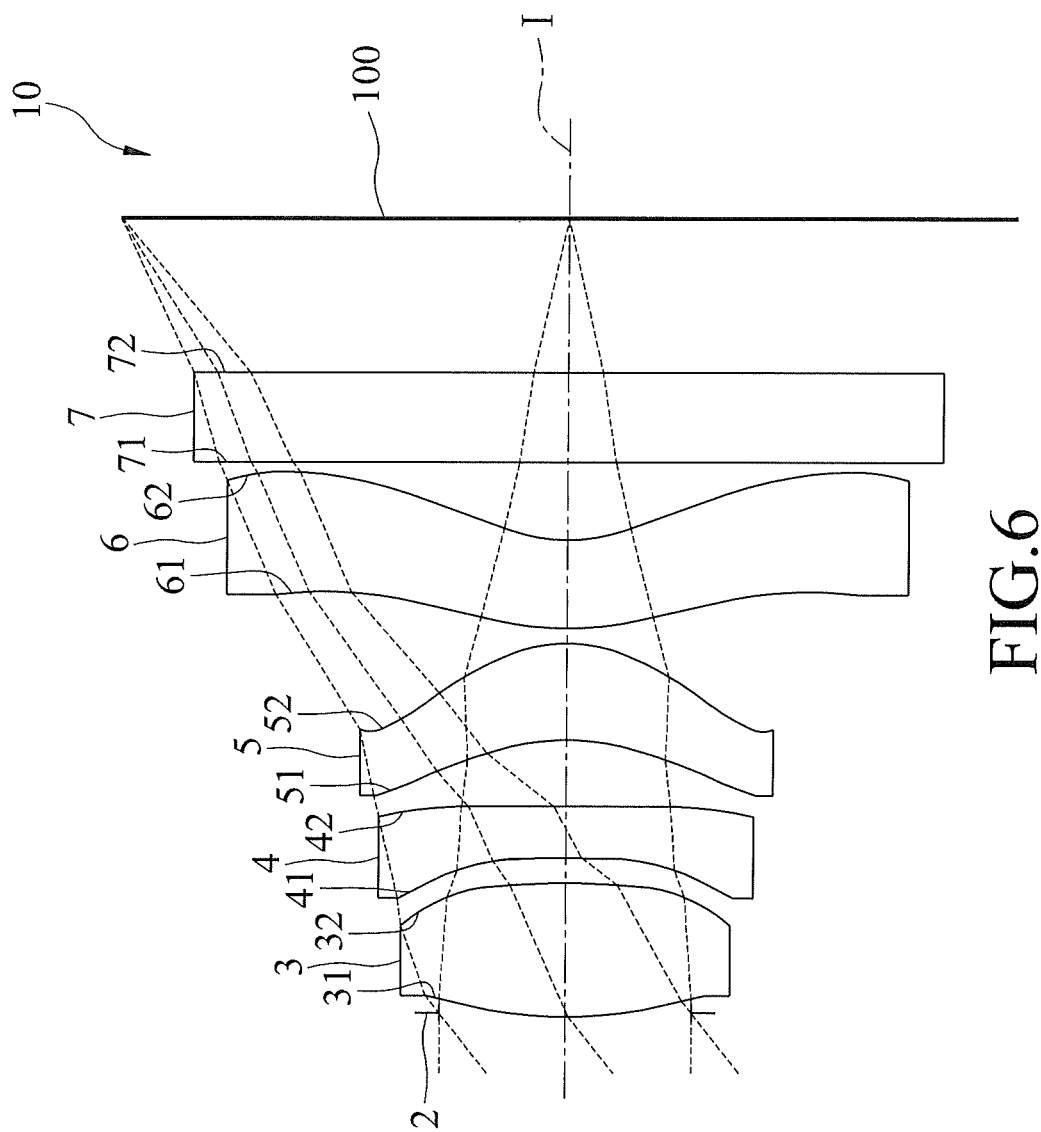
FIG. 6 is a schematic diagram that illustrates the second embodiment of an imaging lens according to the present invention.
Figure 9:
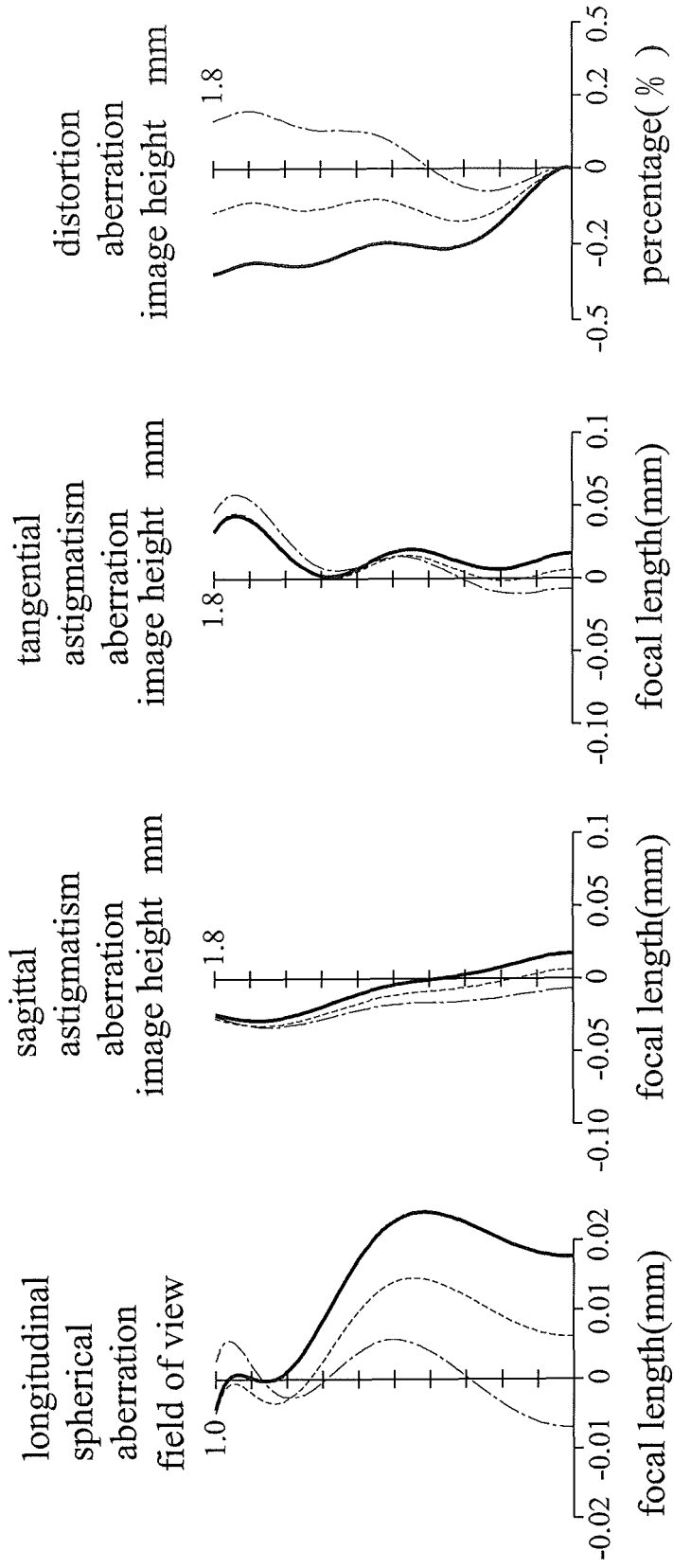
FIGS. 9(a) to 9(d) show different optical characteristics of the imaging lens of the second embodiment.

FIG. 6 illustrates the second embodiment of an imaging lens 10 according to the present invention, which has a configuration similar to that of the first embodiment. The differences between the first and second embodiments of the imaging lens 10 of this invention reside in modifications of some optical data, aspherical coefficients and the lens parameters of the lens elements 3-6. It should be noted that the reference numerals of the concave portions and the convex portions in the following embodiments that are the same as those indicated in the first embodiment are omitted in the drawings of the following embodiments for the sake of clarity.

Shown in FIG. 7 is a table that lists values of some optical data corresponding to the surfaces 31-71, 32-72 of the second embodiment. The imaging lens 10 has an overall system effective focal length of 2.196 mm, an HFOV of 38.832°, an F-number of 2.208, and a system length of 3.112 mm.

Shown in FIG. 8 is a table that lists values of some aspherical coefficients of the aforementioned relationship (1) corresponding to the second embodiment.

Relationships among some of the aforementioned lens parameters corresponding to the second embodiment are listed in columns of FIGS. 34 and 36 corresponding to the second embodiment.

FIGS. 9(a) to 9(d) respectively show simulation results corresponding to longitudinal spherical aberration, sagittal astigmatism aberration, tangential astigmatism aberration, and distortion aberration of the second embodiment. It can be understood from FIGS. 9(a) to 9(d) that the second embodiment is able to achieve a relatively good optical performance.

In comparison to the first embodiment, the second embodiment has a shorter system length, a greater HFOV, and better imaging quality. Additionally, manufacture of the second embodiment is relatively easier as compared to the first embodiment, such that yield rate of the second embodiment may be greater than that of the first embodiment.

Figure 10:
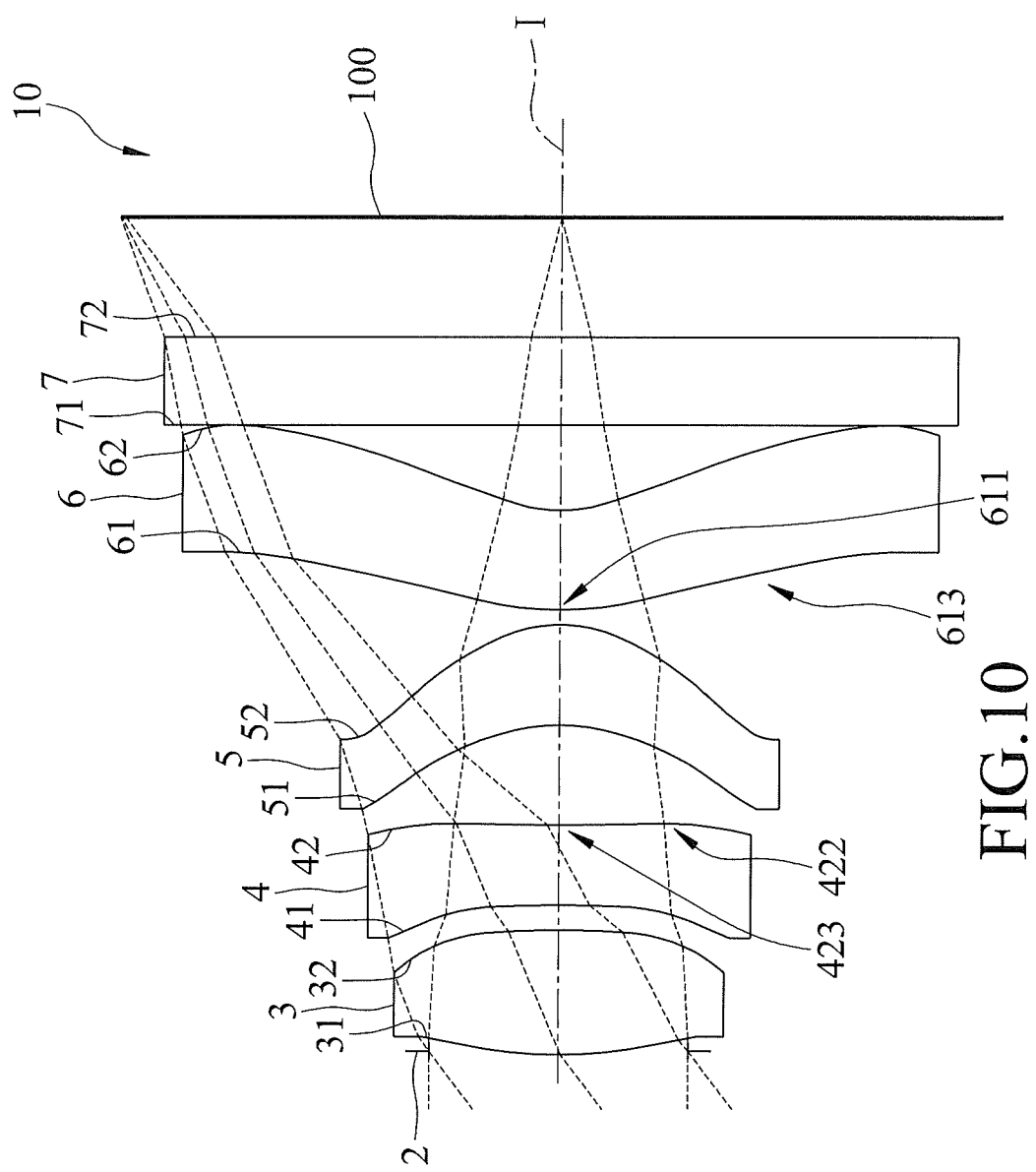
FIG. 10 is a schematic diagram that illustrates the third embodiment of an imaging lens according to the present invention.
Figure 13:
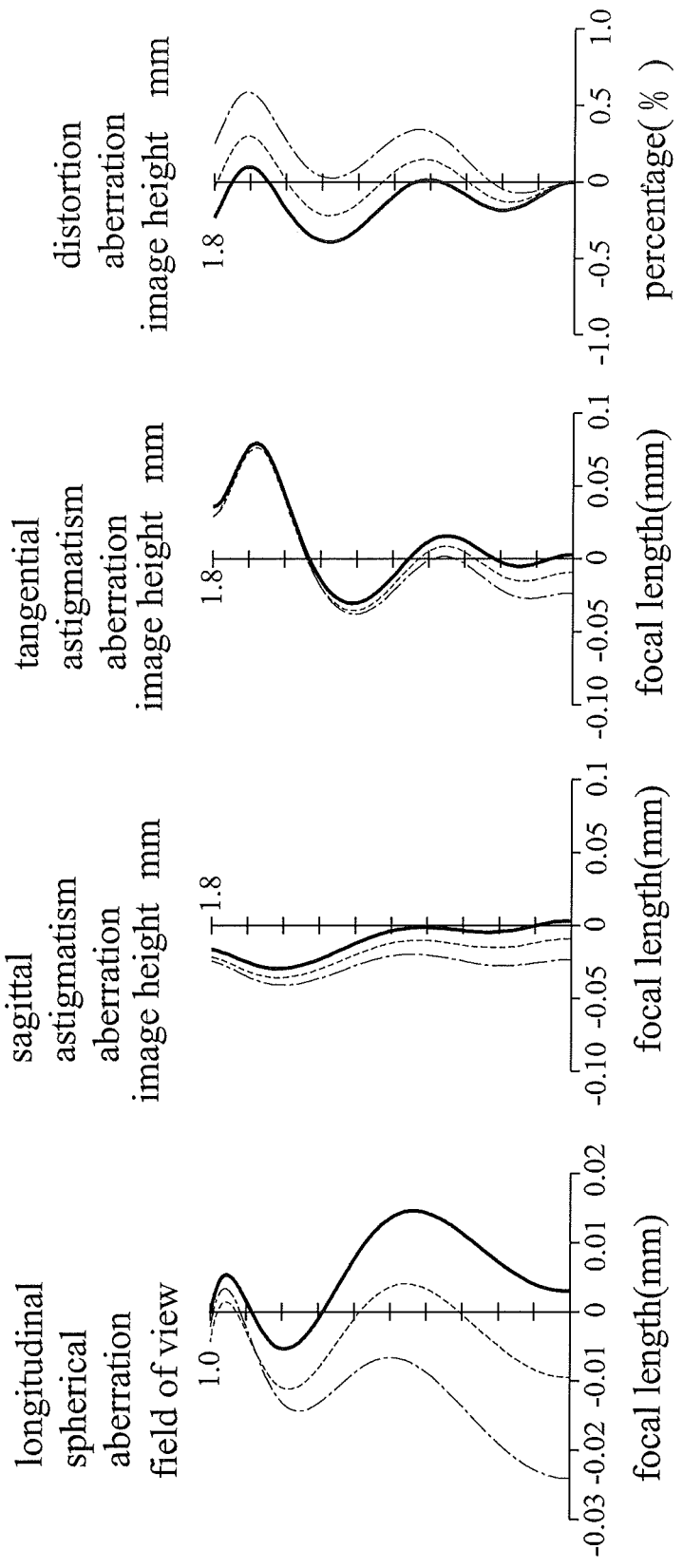
FIGS. 13(a) to 13(d) show different optical characteristics of the imaging lens of the third embodiment.

FIG. 10 illustrates the third embodiment of an imaging lens 10 according to the present invention, which has a configuration similar to that of the first embodiment. The differences between the first and third embodiments of the imaging lens 10 of this invention reside in that: in the third embodiment, the image-side surface 42 of the second lens element 4 has a concave portion 423 in a vicinity of the optical axis (I), and the object-side surface 61 of the fourth lens element 6 has a convex portion 613 in a vicinity of the periphery of the fourth lens element 6. In FIG. 10, the reference numerals of the concave portions and the convex portions that are the same as those of the first embodiment are omitted for the sake of clarity.

Shown in FIG. 11 is a table that lists values of some optical data corresponding to the surfaces 31-71, 32-72 of the third embodiment. The imaging lens 10 has an overall system effective focal length of 2.294 mm, an HFOV of 37.552°, an F-number of 2.202, and a system length of 3.350 mm.

Shown in FIG. 12 is a table that lists values of some aspherical coefficients of the aforementioned relationship (1) corresponding to the third embodiment.

Relationships among some of the aforementioned lens parameters corresponding to the third embodiment are listed in columns of FIGS. 34 and 36 corresponding to the third embodiment.

FIGS. 13(a) to 13(d) respectively show simulation results corresponding to longitudinal spherical aberration, sagittal astigmatism aberration, tangential astigmatism aberration, and distortion aberration of the third embodiment. It can be understood from FIGS. 13(a) to 13(d) that the third embodiment is able to achieve a relatively good optical performance.

In comparison to the first embodiment, the third embodiment has a greater HFOV, and may have a higher yield rate since the third embodiment is relatively easier to fabricate.

Figure 14:
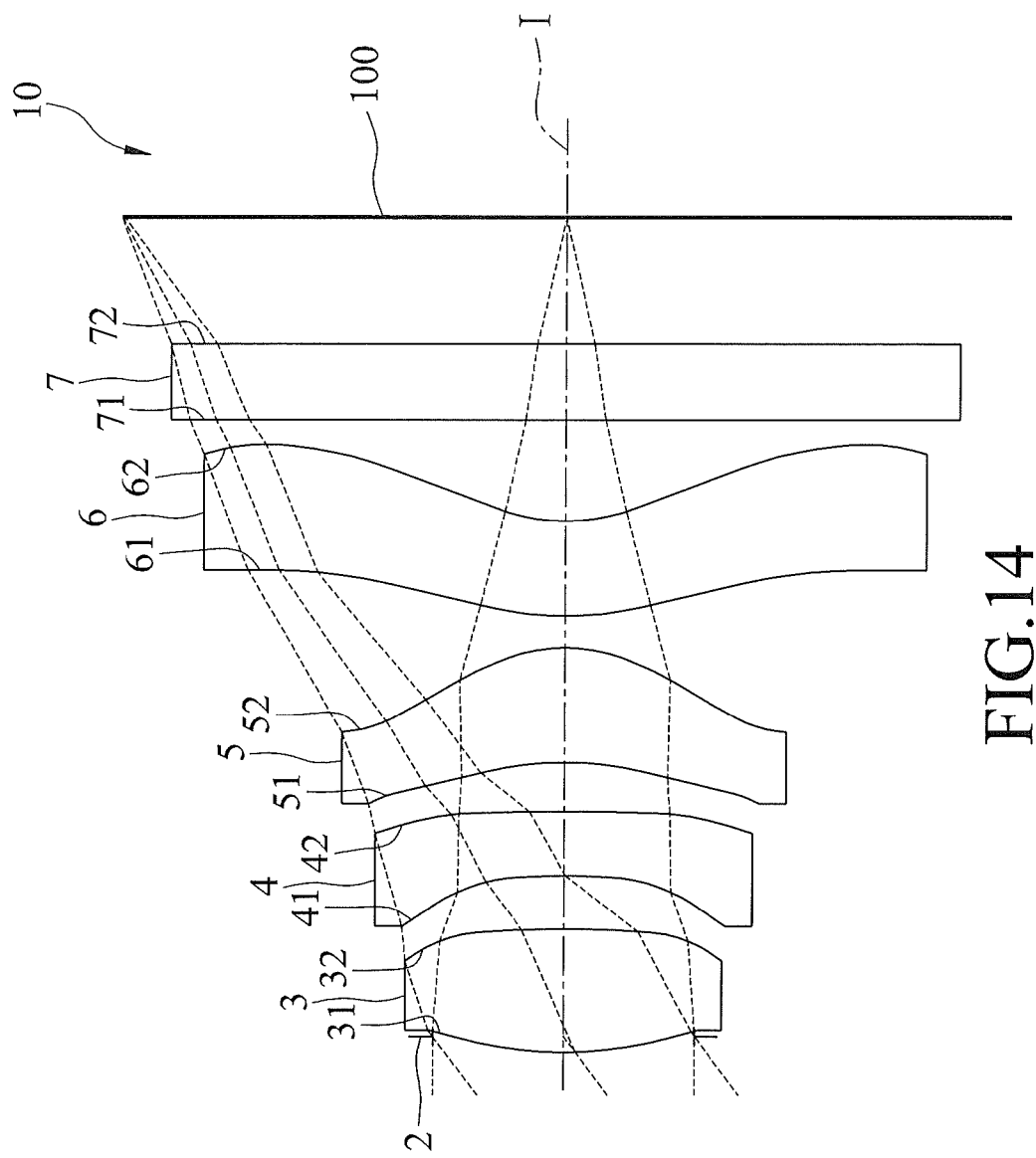
FIG. 14 is a schematic diagram that illustrates the fourth embodiment of an imaging lens according to the present invention.
Figure 17:
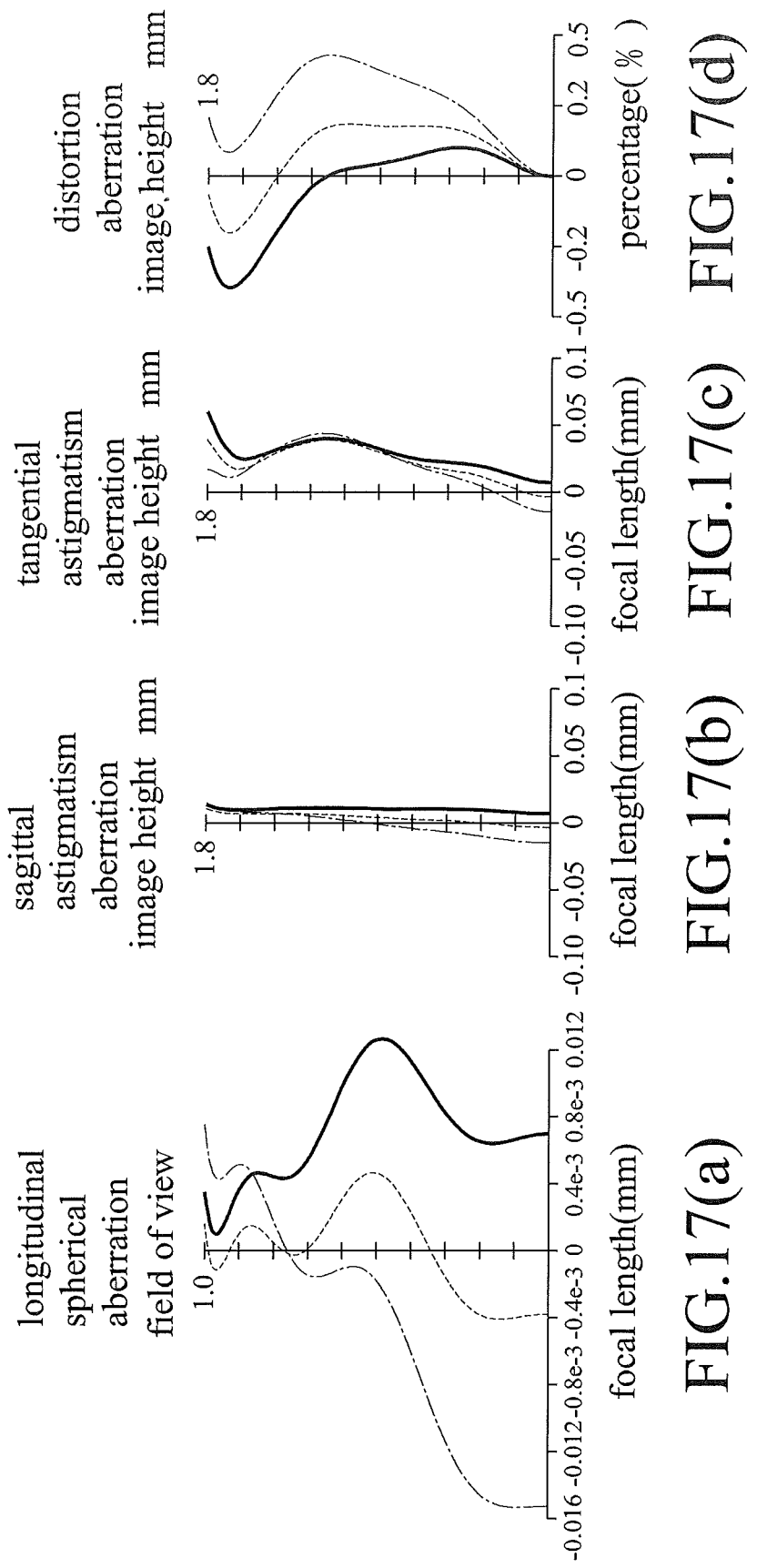
FIGS. 17(a) to 17(d) show different optical characteristics of the imaging lens of the fourth embodiment.

FIG. 14 illustrates the fourth embodiment of an imaging lens 10 according to the present invention, which has a configuration similar to that of the first embodiment. The differences between the first and fourth embodiments reside in modifications of some optical data, aspherical coefficients and the lens parameters of the lens elements 3-6. In FIG. 14, the reference numerals of the concave portions and the convex portions that are the same as those of the first embodiment are omitted for the sake of clarity.

Shown in FIG. 15 is a table that lists values of some optical data corresponding to the surfaces 31-71, 32-72 of the fourth embodiment. The imaging lens 10 has an overall system effective focal length of 2.308 mm, an HFOV of 37.465°, an F-number of 2.213, and a system length of 3.299 mm.

Shown in FIG. 16 is a table that lists values of some aspherical coefficients of the aforementioned relationship (1) corresponding to the fourth embodiment.

Relationships among some of the aforementioned lens parameters corresponding to the fourth embodiment are listed in columns of FIGS. 34 and 36 corresponding to the fourth embodiment.

FIGS. 17(a) to 17(d) respectively show simulation results corresponding to longitudinal spherical aberration, sagittal astigmatism aberration, tangential astigmatism aberration, and distortion aberration of the fourth embodiment. It can be understood from FIGS. 17(a) to 17(d) that the fourth embodiment is able to achieve a relatively good optical performance.

In comparison to the first embodiment, the fourth embodiment has a shorter system length, a greater HFOV, better imaging quality, and may have a higher yield rate since the fourth embodiment is relatively easier to fabricate.

Figure 18:
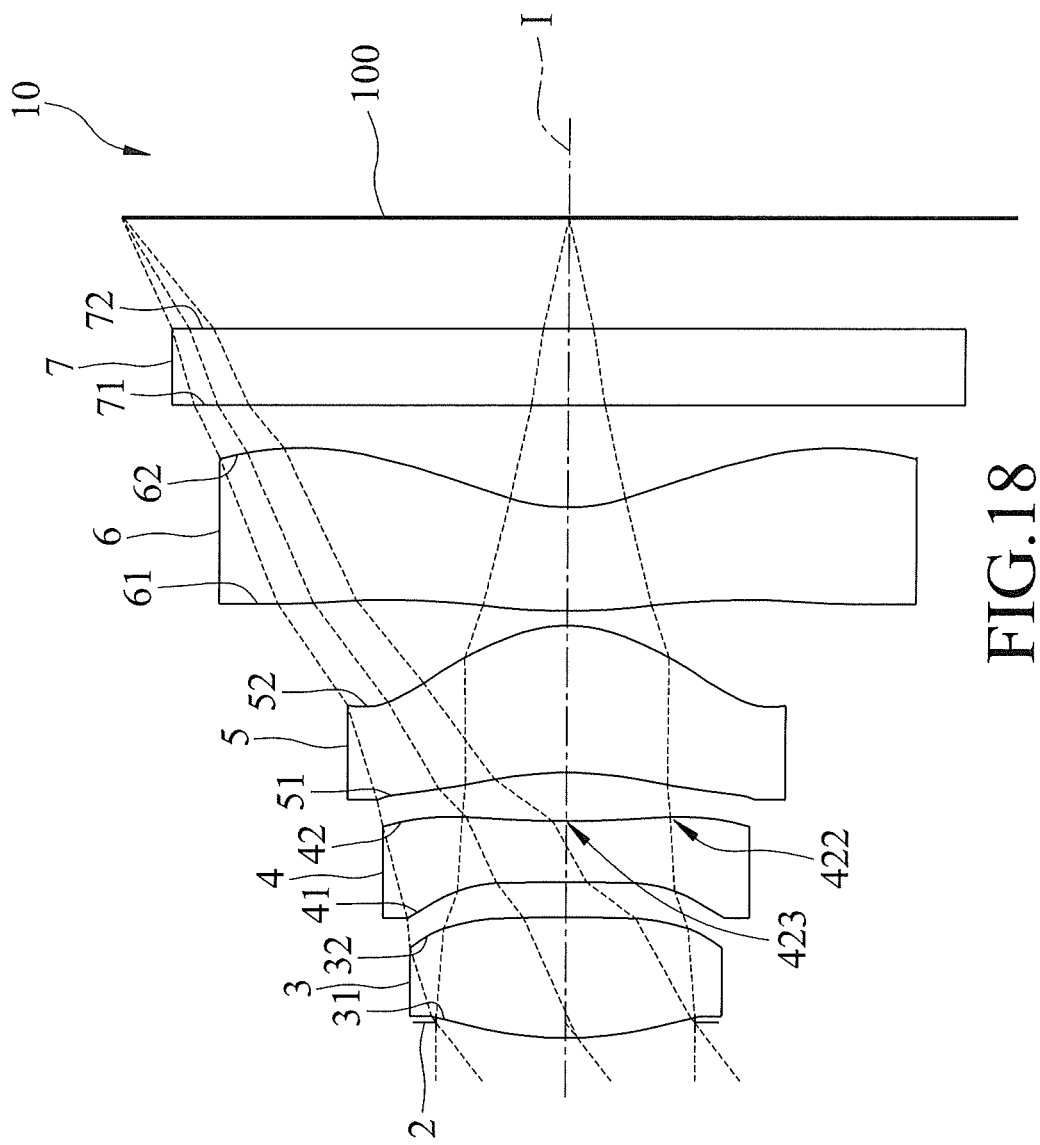
FIG. 18 is a schematic diagram that illustrates the fifth embodiment of an imaging lens according to the present invention.
Figure 21:
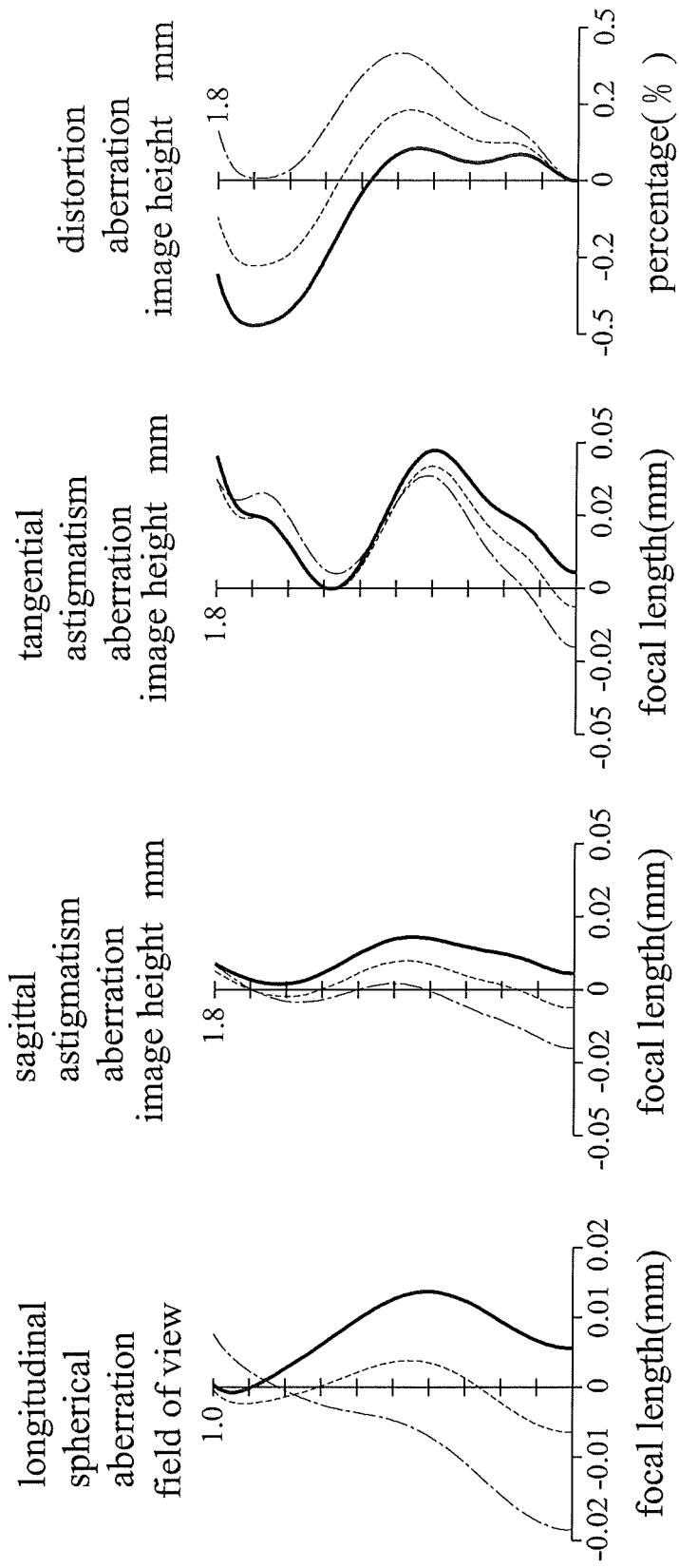
FIGS. 21(a) to 21(d) show different optical characteristics of the imaging lens of the fifth embodiment.

FIG. 18 illustrates the fifth embodiment of an imaging lens 10 according to the present invention, which has a configuration similar to that of the first embodiment. The differences between the first and fifth embodiments of the imaging lens 10 of this invention reside in that: in the fifth embodiment, the image-side surface 42 of the second lens element 4 has a concave portion 423 in a vicinity of the optical axis (I). In FIG. 18, the reference numerals of the concave portions and the convex portions that are the same as those of the first embodiment are omitted for the sake of clarity.

Shown in FIG. 19 is a table that lists values of some optical data corresponding to the surfaces 31-71, 32-72 of the fifth embodiment. The imaging lens 10 has an overall system effective focal length of 2.242 mm, an HFOV of 38.252°, an F-number of 2.215, and a system length of 3.202 mm.

Shown in FIG. 20 is a table that lists values of some aspherical coefficients of the aforementioned relationship (1) corresponding to the fifth embodiment.

Relationships among some of the aforementioned lens parameters corresponding to the fifth embodiment are listed in columns of FIGS. 35 and 37 corresponding to the fifth embodiment.

FIGS. 21(a) to 21(d) respectively show simulation results corresponding to longitudinal spherical aberration, sagittal astigmatism aberration, tangential astigmatism aberration, and distortion aberration of the fifth embodiment. It can be understood from FIGS. 21(a) to 21(d) that the fifth embodiment is able to achieve a relatively good optical performance.

In comparison to the first embodiment, the fifth embodiment has a shorter system length, a greater HFOV, better image quality, and may have a higher yield rate since the fifth embodiment is relatively easier to fabricate.

Figure 22:
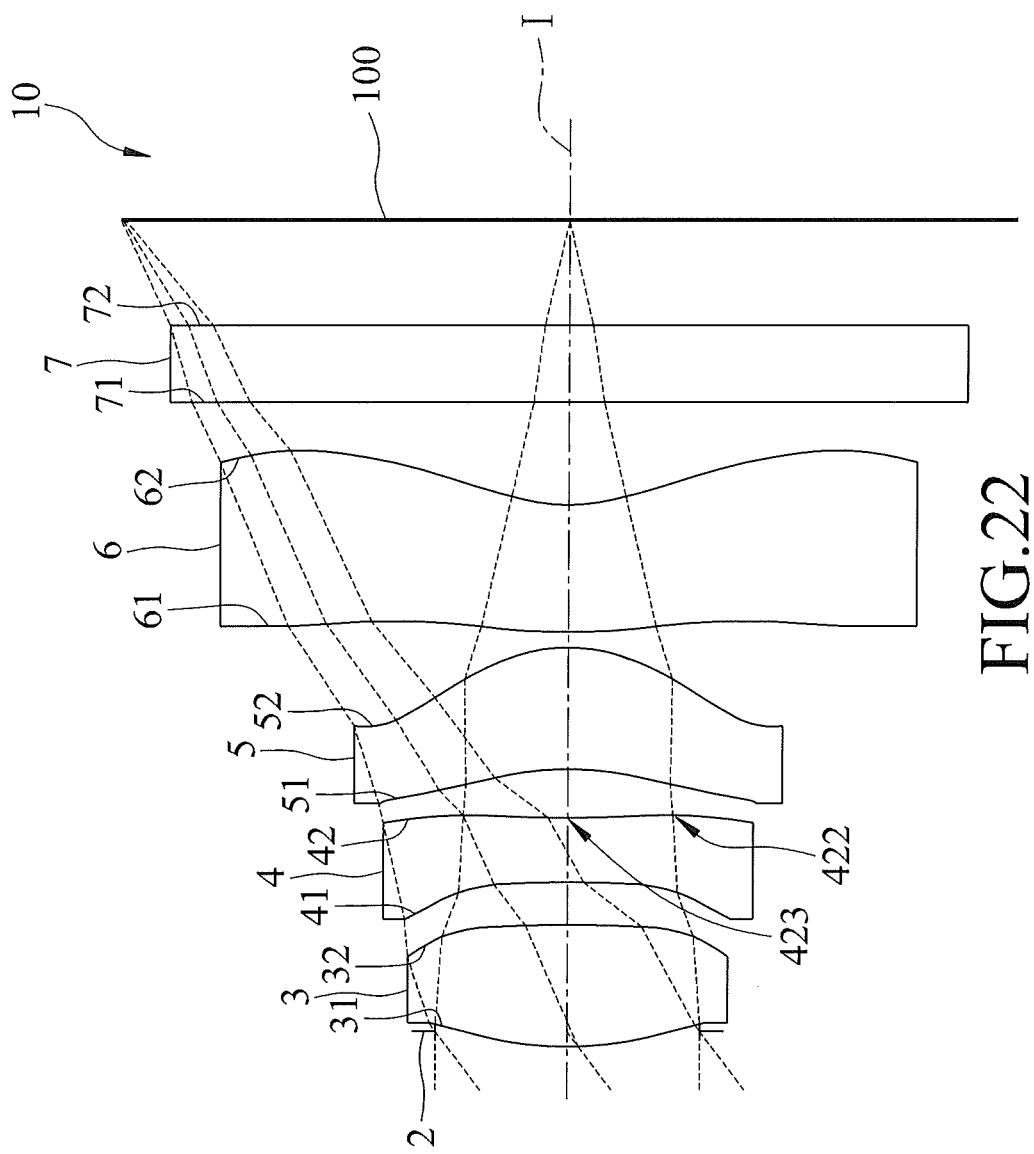
FIG. 22 is a schematic diagram that illustrates the sixth embodiment of an imaging lens according to the present invention.
Figure 25:
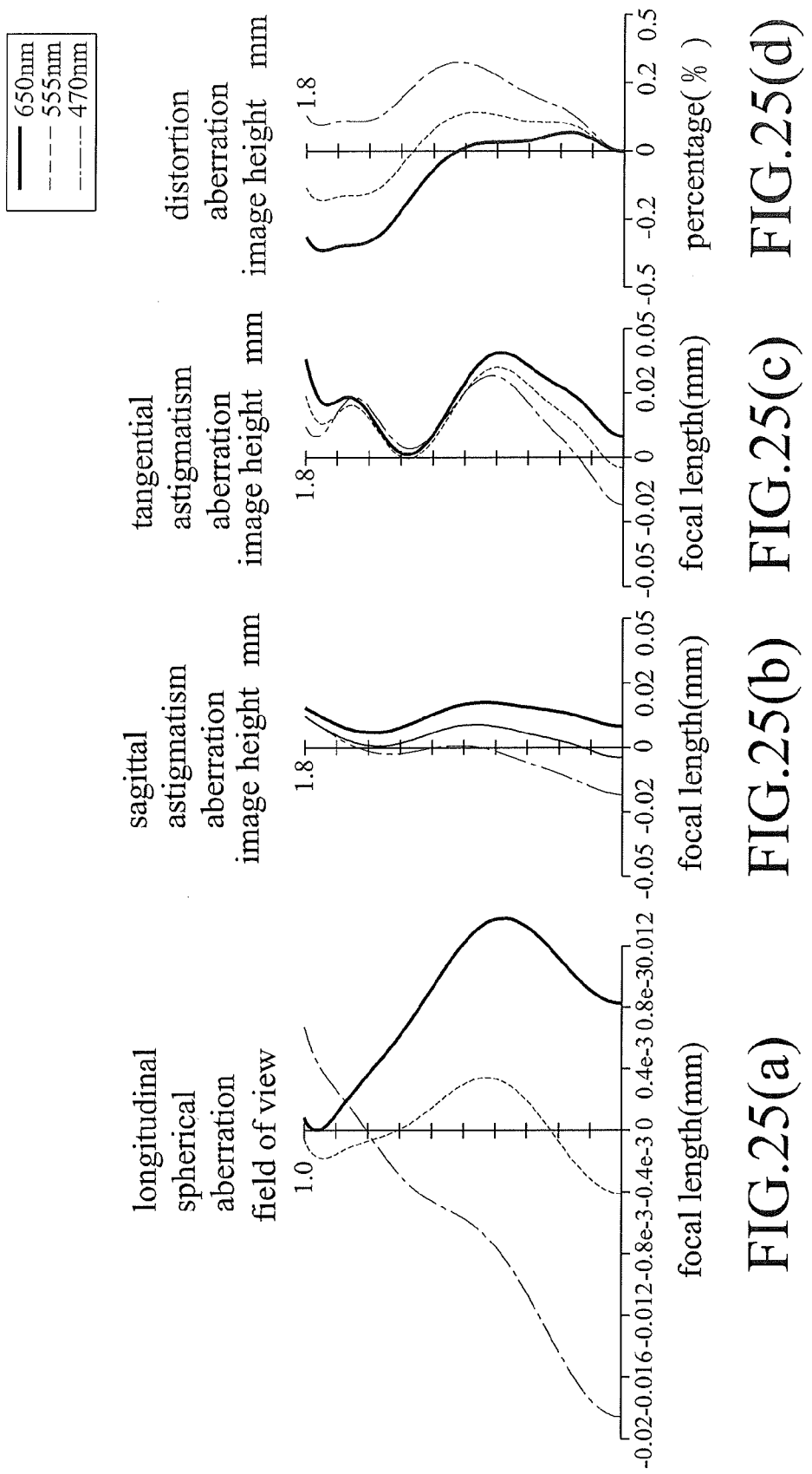
FIGS. 25(a) to 25(d) show different optical characteristics of the imaging lens of the sixth embodiment.

FIG. 22 illustrates the sixth embodiment of an imaging lens 10 according to the present invention, which has a configuration similar to that of the first embodiment. The differences between the first and sixth embodiments of the imaging lens 10 of this invention reside in that the image-side surface 42 of the second lens element 4 has a concave portion 423 in a vicinity of the optical axis (I). In FIG. 22, the reference numerals of the concave portions and the convex portions that are the same as those of the first embodiment are omitted for the sake of clarity.

Shown in FIG. 23 is a table that lists values of some optical data corresponding to the surfaces 31-71, 32-72 of the sixth embodiment. The imaging lens 10 has an overall system effective focal length of 2.307 mm, an HFOV of 37.485°, an F-number of 2.213, and a system length of 3.225 mm.

Shown in FIG. 24 is a table that lists values of some aspherical coefficients of the aforementioned relationship (1) corresponding to the sixth embodiment.

Relationships among some of the aforementioned lens parameters corresponding to the sixth embodiment are listed in columns of FIGS. 35 and 37 corresponding to the sixth embodiment.

FIGS. 25(a) to 25(d) respectively show simulation results corresponding to longitudinal spherical aberration, sagittal astigmatism aberration, tangential astigmatism aberration, and distortion aberration of the sixth embodiment. It can be understood from FIGS. 25(a) to 25(d) that the sixth embodiment is able to achieve a relatively good optical performance.

In comparison to the first embodiment, the sixth embodiment has a shorter system length, a greater HFOV, better imaging quality, and may have a higher yield rate since the sixth embodiment is relatively easier to fabricate.

Figure 26:
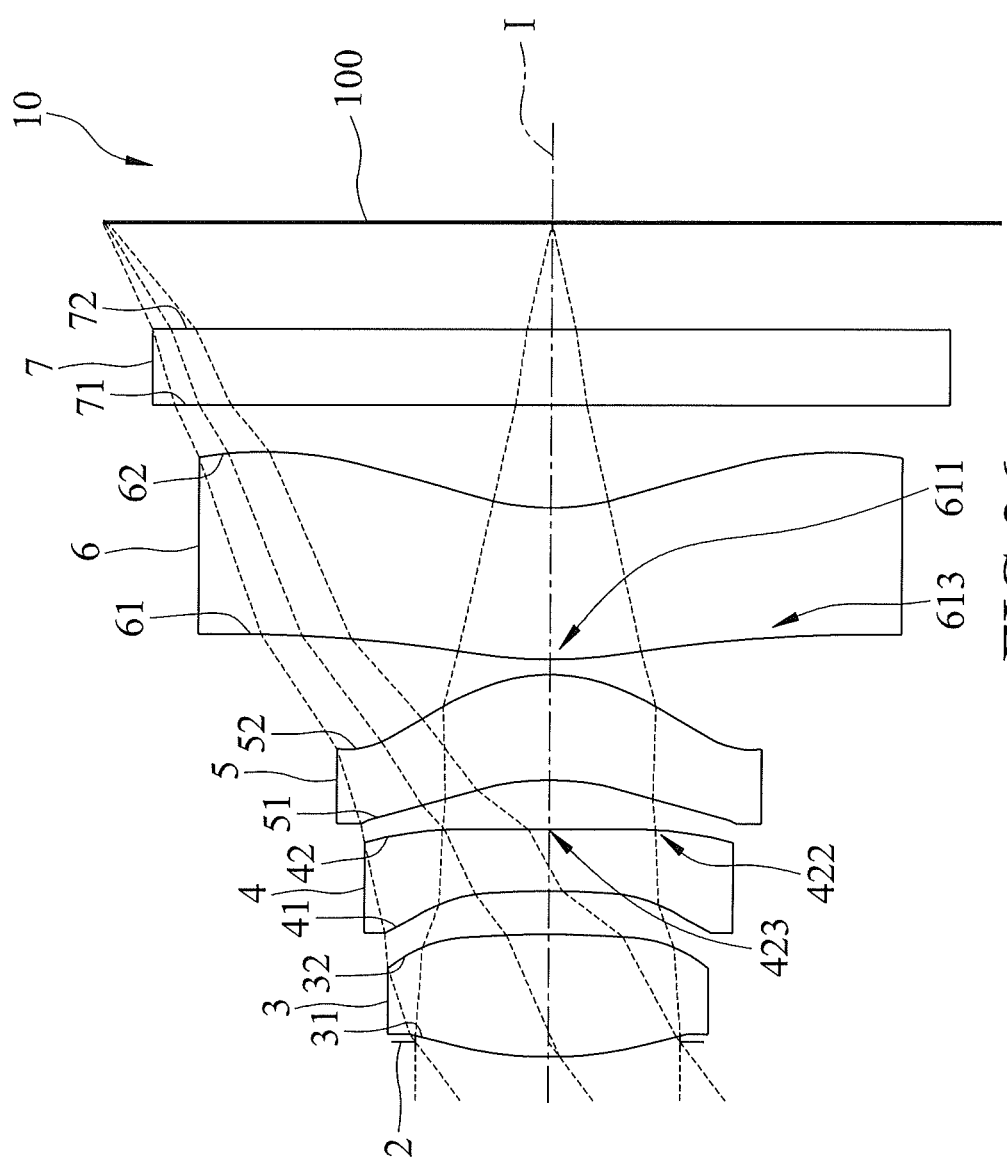
FIG. 26 is a schematic diagram that illustrates the seventh embodiment of an imaging lens according to the present invention.
Figure 29:
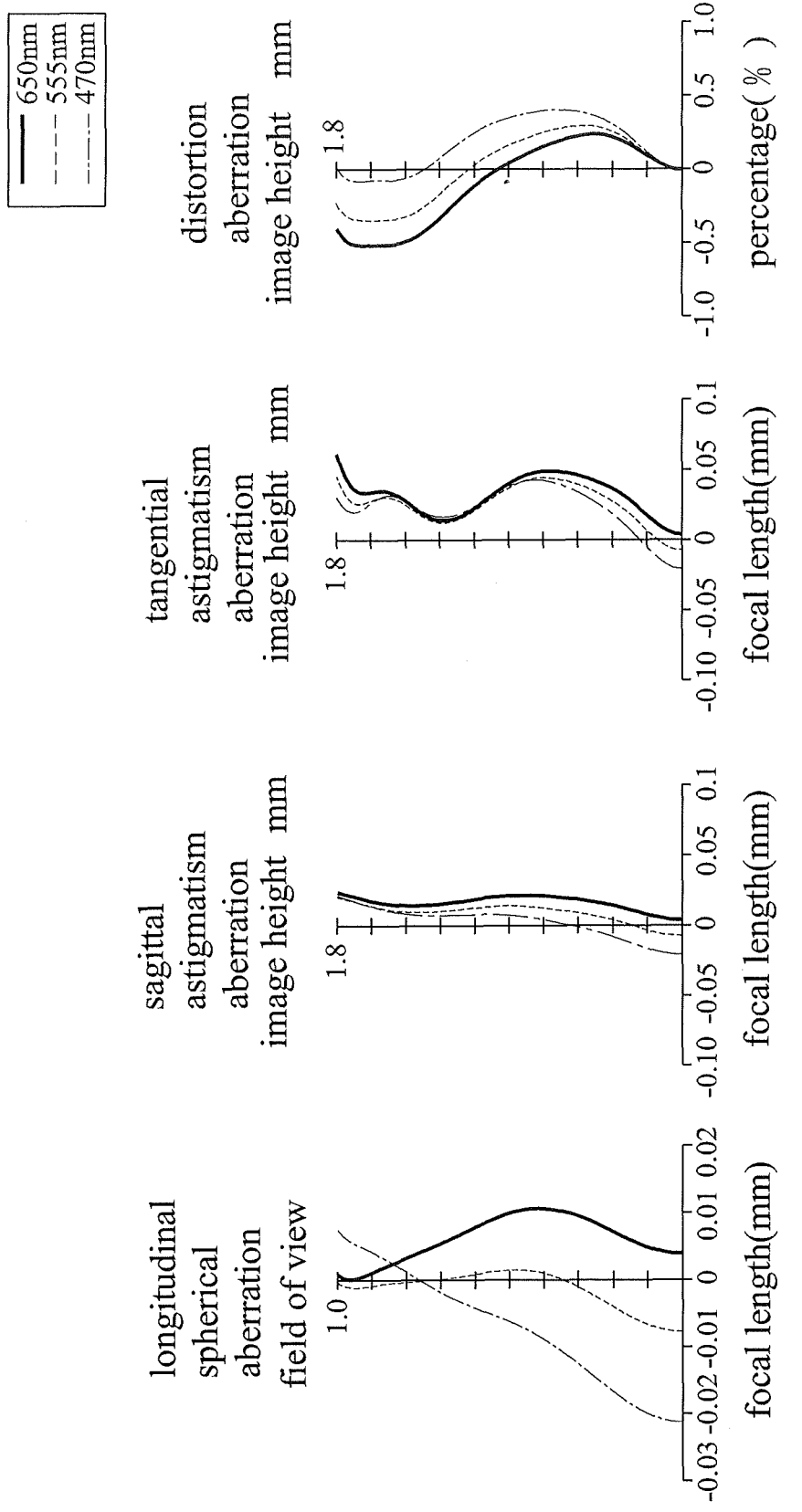
FIGS. 29(a) to 29(d) show different optical characteristics of the imaging lens of the seventh embodiment.

FIG. 26 illustrates the seventh embodiment of an imaging lens 10 according to the present invention, which has a configuration similar to that of the first embodiment. The differences between the first and seventh embodiments of the imaging lens 10 of this invention reside in that: in the seventh embodiment, the image-side surface 42 of the second lens element 4 has a concave portion 423 in a vicinity of the optical axis (I), and the object-side surface 61 of the fourth lens element 6 has a convex portion 613 in a vicinity of the periphery of the fourth lens element 6. In FIG. 26, the reference numerals of the concave portions and the convex portions that are the same as those of the first embodiment are omitted for the sake of clarity.

Shown in FIG. 27 is a table that lists values of some optical data corresponding to the surfaces 31-71, 32-72 of the seventh embodiment. The imaging lens 10 has an overall system effective focal length of 2.307 mm, an HFOV of 37.466°, an F-number of 2.221, and a system length of 3.273 mm.

Shown in FIG. 28 is a table that lists values of some aspherical coefficients of the aforementioned relationship (1) corresponding to the seventh embodiment.

Relationships among some of the aforementioned lens parameters corresponding to the seventh embodiment are listed in columns of FIGS. 35 and 37 corresponding to the seventh embodiment.

FIGS. 29(a) to 29(d) respectively show simulation results corresponding to longitudinal spherical aberration, sagittal astigmatism aberration, tangential astigmatism aberration, and distortion aberration of the seventh embodiment. It can be understood from FIGS. 29(a) to 29(d) that the seventh embodiment is able to achieve a relatively good optical performance.

In comparison to the first embodiment, the seventh embodiment has a shorter system length, a greater HFOV, and may have a higher yield rate since the seventh embodiment is relatively easier to fabricate.

Figure 30:
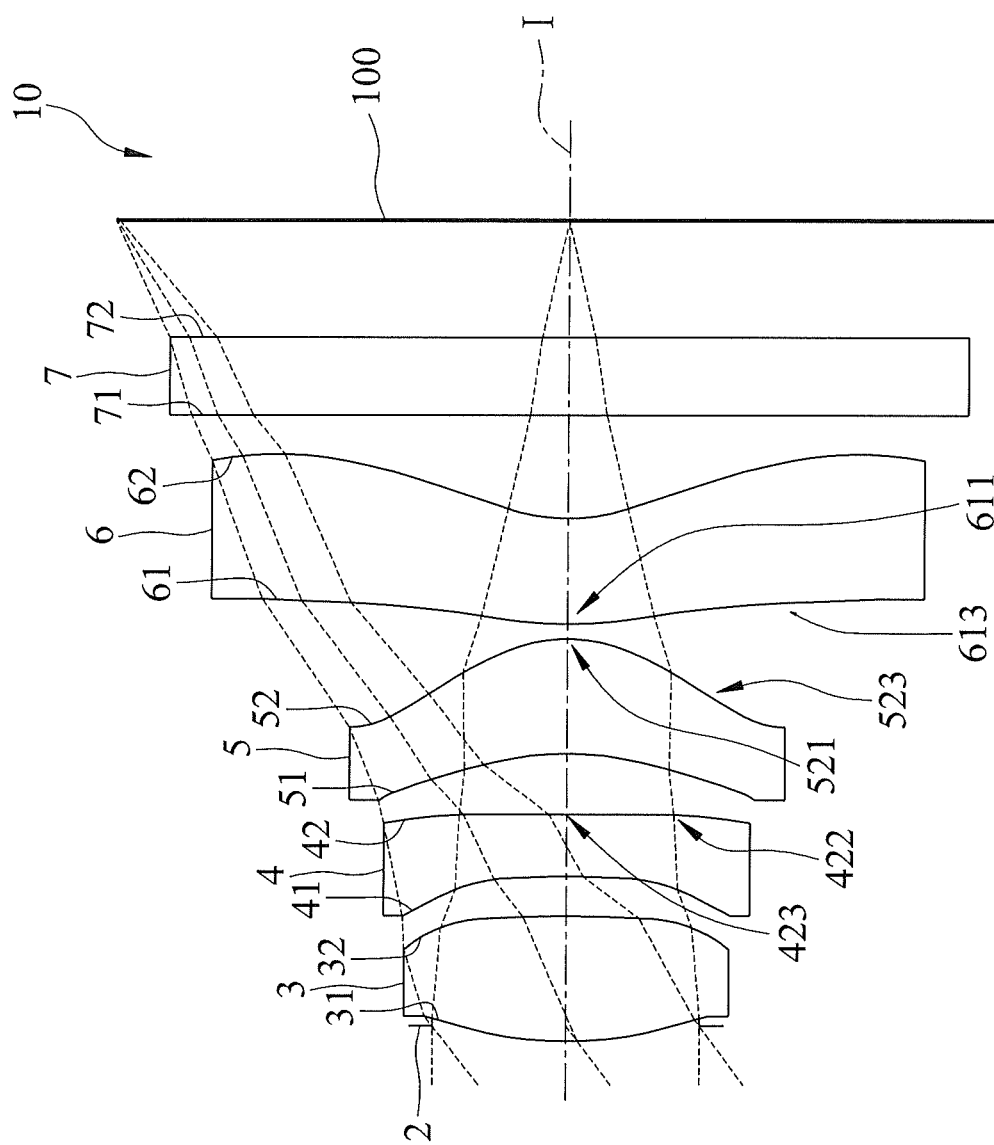
FIG. 30 is a schematic diagram that illustrates the eighth embodiment of an imaging lens according to the present invention.
Figure 33:
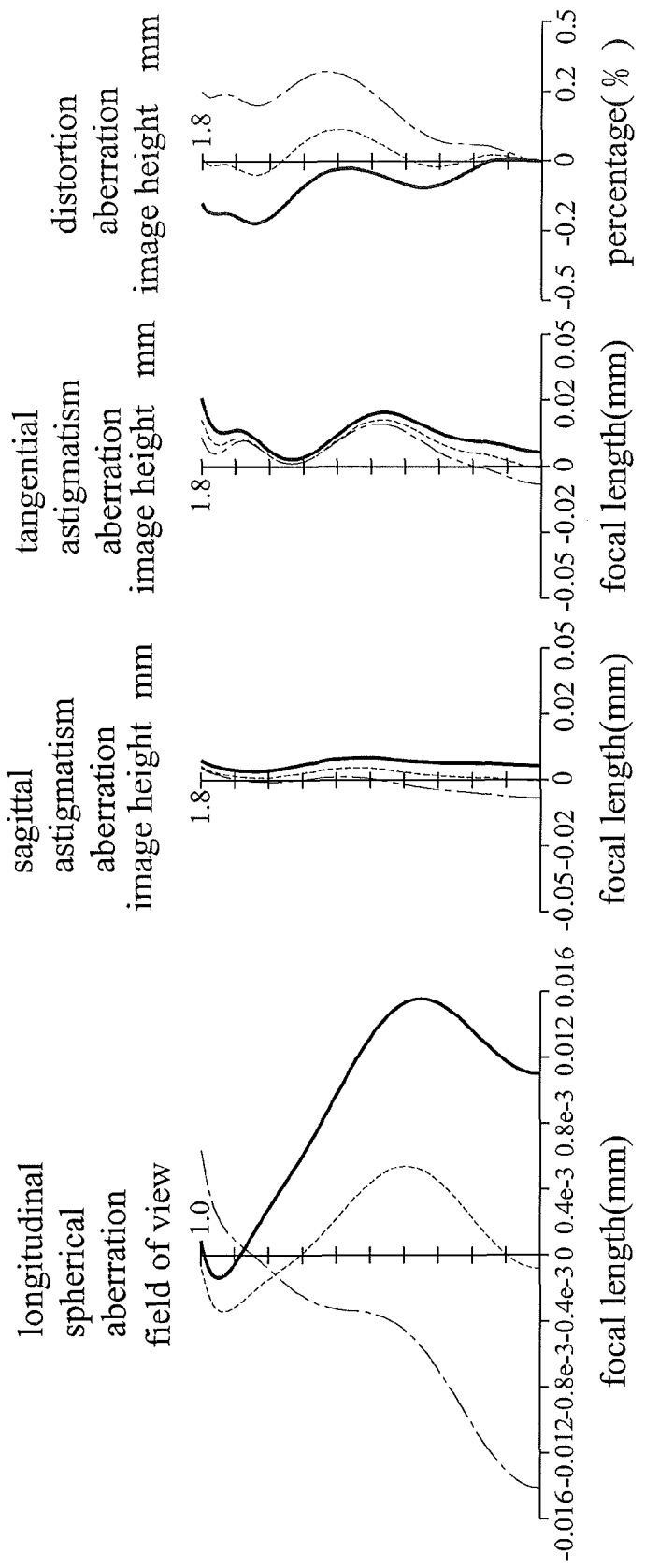
FIGS. 33(a) to 33(d) show different optical characteristics of the imaging lens of the eighth embodiment.

FIG. 30 illustrates the eighth embodiment of an imaging lens 10 according to the present invention, which has a configuration similar to that of the first embodiment. The differences between the first and eighth embodiments of the imaging lens 10 of this invention reside in that: the image-side surface 42 of the second lens element 4 has a concave portion 423 in a vicinity of the optical axis (I), and the image-side surface 52 of the third lens element 5 is a convex surface that has a convex portion 523 in a vicinity of the periphery of the third lens element 5. The object-side surface 61 of the fourth lens element 6 is a convex surface that has a convex portion 613 in a vicinity of the periphery of the fourth lens element 6. In FIG. 30, the reference numerals of the concave portions and the convex portions that are the same as those of the first embodiment are omitted for the sake of clarity.

Shown in FIG. 31 is a table that lists values of some optical data corresponding to the surfaces 31-71, 32-72 of the eighth embodiment. The imaging lens 10 has an overall system effective focal length of 2.307 mm, an HFOV of 37.488°, an F-number of 2.207, and a system length of 3.186 mm.

Shown in FIG. 32 is a table that lists values of some aspherical coefficients of the aforementioned relationship (1) corresponding to the eighth embodiment.

Relationships among some of the aforementioned lens parameters corresponding to the eighth embodiment are listed in columns of FIGS. 35 and 37 corresponding to the eighth embodiment.

FIGS. 33(a) to 33(d) respectively show simulation results corresponding to longitudinal spherical aberration, sagittal astigmatism aberration, tangential astigmatism aberration, and distortion aberration of the eighth embodiment. It can be understood from FIGS. 33(a) to 33(d) that the eighth embodiment is able to achieve a relatively good optical performance.

In comparison to the first embodiment, the eighth embodiment has a shorter system length, a greater HFOV, and better imaging quality. Additionally, manufacture of the eighth embodiment is relatively easier as compared to the first embodiment, such that yield rate of the eighth embodiment may be greater than that of the first embodiment.

Shown in FIGS. 34 to 37 are tables each listing the aforesaid relationships among some of the aforementioned lens parameters corresponding to the eighth embodiments for comparison. It should be noted that the values of the lens parameters and the relationships listed in FIGS. 34 to 37 are rounded off to the third decimal place. When each of the lens parameters of the imaging lens 10 according to this invention satisfies the following optical relationships, the optical performance is still relatively good even with the reduced system length:

$6 \leq EFL/T2 \leq 11$; $1.4 \leq Gaa/T2 \leq 2.11$; $5 \leq ALT/T2 \leq 7.2$; and $4.6 \leq BFL/T2$: The second lens element 4 has a relatively small effective optical diameter, and the reducible ratio of T2 is relatively large. Although reduction in EFL, Gaa and ALT favors reduction of the system length of the imaging lens 10, ELF/T2, Gaa/T2, and ALT/G2 should be designed to be within proper ranges for ease of manufacture and a relatively simple assembling process. Design of BFL should be sufficient for accommodating the optical filter 7 and other elements. Thus, design of BFL should tend to be large. Preferably, $4.6 \leq BFL/T2 \leq 7$.

$4 \leq ALT/G23 \leq 18$; $1 \leq T4/G23$; $Gaa/G23 \leq 2.8$; $T3/G23 \leq 1.9$; $2.1 \leq Gaa/(G12+G34)$; and $T1/G23 \leq 0.5$: By virtue of configurations of the convex portions 321, 322 of the first lens element 3 and the concave portions 411, 412 of the second lens element 4, G12 may be made smaller without causing interference between the first and second lens elements 3, 4. By virtue of configurations of the convex portion 521 of the third lens element 5 and the convex portion 611 of the fourth lens element 6, and the larger difference in optical effective diameter between the third and fourth lens elements 5, 6, G34 may be made smaller without causing interference between the third and fourth lens elements 5, 6. Since G23 should be designed to be within a proper range to allow light entering the third lens element 5 at an appropriate height for convergence, reducible ratio thereof is relatively small. In order to reduce the system length of the imaging lens 10, except for design of the fourth lens element 6 that has a relatively large effective optical diameter should tend to be large, designs of the remaining lens element should tend to be thinner. ALT/G23 should be designed to be within a proper range for ease of manufacture. Designs of Gaa/G23, T3/G23, and T1/G23 should tend to be small, whereas designs of Gaa/(G12+G34) and T4/G23 should tend to be large. Preferably, $1 \leq T4/G23 \leq 3.5$; $1 \leq Gaa/G23 \leq 2.8$; $0.5 \leq T3/G23 \leq 1.9$; $2.1 \leq Gaa/(G12+G34) \leq 4$; and $1 \leq T1/G23 \leq 2.5$.

$1.9 \leq T3/(G12+G34)$; $EFL/T3 \leq 6.5$; $3.55 \leq ALT/T3$; $2.65 \leq BFL/T3$; and $ALT/T4 \leq 4.2$: Although the thickness of the third lens element 5 should tend to be small, reducible ratio of T3 is limited by current technology, and is relatively small compared to G12 and G34. Thus design of T3/(G12+G34) should tend to be large. As mentioned above, since design of BFL should be within a proper range, design of BFL/T3 should tend to be large. Since ALT includes T4 which has a relatively small reducible ratio as compared to that of T3, design of ALT/T3 should tend to be large whereas design of ALT/T4 should tend to be small. EFL is related to T3, the air gap lengths among lens elements, the thickness of the lens elements, and the material for manufacturing the lens element. When $EFL/T3 \leq 6.5$ is satisfied, better imaging quality and yield rate can be obtained. Preferably, $1.9 \leq T3/(G12+G34) \leq 3.5$; $3 \leq EFL/T3 \leq 6.5$; $3.55 \leq ALT/T3 \leq 5$; $2.65 \leq BFL/T3 \leq 3.8$; and $2.5 \leq ALT/T4 \leq 4.2$.

$7 \leq TTL/T3$; $TTL/T1 \leq 7.15$ and $TTL/T4 \leq 9.1$: A relatively large reducible ratio of TTL represents reduction in total length of the imaging lens 10. As mentioned above, design of T4 should tend to be large and design of T3 should tend to be small. Since the first lens element 3 has a positive refractive power, if the radius of curvature of each of the surfaces 31, 32 and the material of the first lens element 3 are not variables, the thickness of the first lens element 3 should be designed to be within a proper range to achieve a larger positive refractive power for focusing of the imaging lens 10. As a result, design of TTL/T1 should tend to be small. Preferably, $7 \leq TTL/T3 \leq 10$; $5 \leq TTL/T1 \leq 7.15$; and $4.5 \leq TTL/T4 \leq 9.1$.

Although the design of an optical system is generally associated with unpredictability, satisfaction of the aforementioned relationships may enable the imaging lens 10 to have reductions in the system length and the F-number, to have wider field of view, to have enhancement of imaging quality, or to have a relatively higher yield rate of assembly, thereby alleviating at least one drawback of the prior art.

To sum up, effects and advantages of the imaging lens 10 according to the present invention are described hereinafter.

1. By virtue of cooperation among the convex portions 321, 322, the concave portions 411, 412, the concave portions 511, 512, the convex portion 521, and the convex portions 611, 622, optical aberration of the imaging may be corrected, thereby improving the image quality of the imaging lens 10. In addition, configuration of the concave portion 613 favors a better yield rate.

2. Configurations of the first lens element 3 having a positive refractive power, the second lens element 4 having a negative refractive power, the third lens element 5 having a positive refractive power and the fourth lens element 6 having a negative refractive power favor aberration correction for the imaging lens 10.

3. Since the fourth lens element 6 is made of a plastic material, it is advantageous for reducing lens weight and fabrication cost, and may be easily made to be aspherical.

4. Through design of the relevant lens parameters, optical aberrations, such as spherical aberration, may be reduced or even eliminated. Further, through surface design and arrangement of the lens elements 3-6, even with the system length reduced, optical aberrations may still be reduced or even eliminated, resulting in relatively good optical performance.

5. Through the aforesaid eight embodiments, it is evident that the system length of this invention may be reduced down to below 3.5 mm, so as to facilitate developing thinner relevant products with economic benefits.

Figure 38:
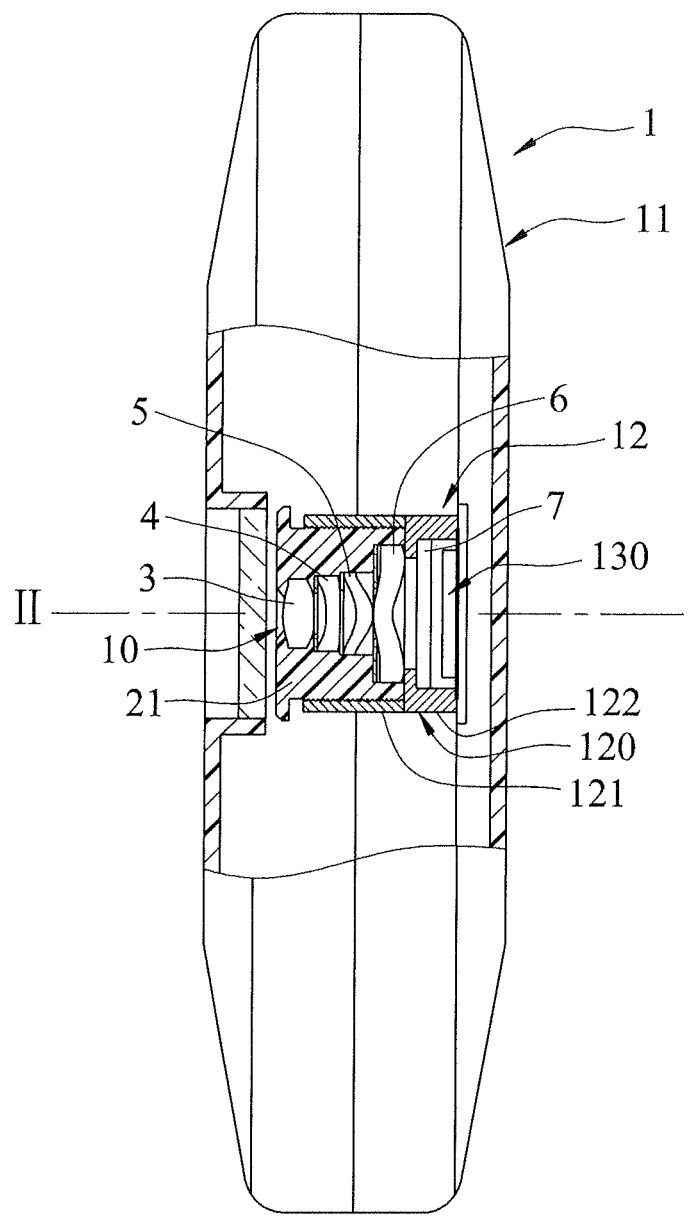
FIG. 38 is a schematic partly sectional view to illustrate a first exemplary application of the imaging lens of the present invention.

Shown in FIG. 38 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1.

The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 39:
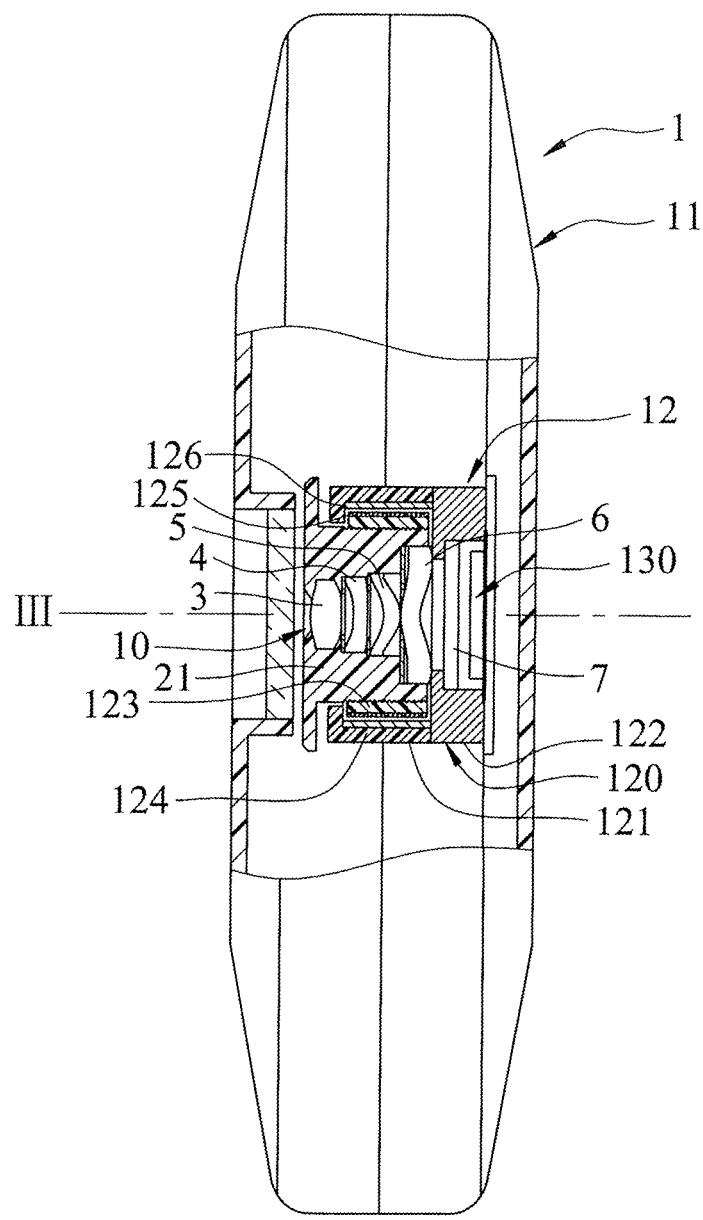
FIG. 39 is a schematic partly sectional view to illustrate a second exemplary application of the imaging lens of the present invention.

Shown in FIG. 39 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop, a first lens element, a second lens element, a third lens element, and a fourth lens element arranged in order from an object side to an image side along an optical axis of said imaging lens, each of said first lens element, said second lens element, said third lens element, and said fourth lens element having a refractive power, an object-side surface facing toward the object side, and an image-side surface facing toward the image side, wherein:

said first lens element has a positive refractive power, and said image-side surface of said first lens element has a convex portion in a vicinity of the optical axis and a convex portion in a vicinity of a periphery of said first lens element;

said second lens element has a negative refractive power, and said object-side surface of said second lens element has a concave portion in a vicinity of the optical axis and a concave portion in a vicinity of a periphery of said second lens element;

said third lens element has a positive refractive power, said object-side surface of said third lens element has a concave portion in a vicinity of the optical axis and a concave portion in a vicinity of a periphery of said third lens element, and said image-side surface of said third lens element has a convex portion in a vicinity of the optical axis;

said fourth lens element has a negative refractive power and is made of a plastic material, said object-side surface of said fourth lens element has a convex portion in a vicinity of the optical axis, and said image-side surface of said fourth lens element has a convex portion in a vicinity of a periphery of said fourth lens element;

said imaging lens satisfies $6 \le EFL/T2 \le 11$; $4 \le ALT/G23 \le 18$; $1.4 \le Gaa/T2 \le 2.11$; $5 \le ALT/T2 \le 7.2$; and $T4/G23 \ge 1$, where EFL represents a system effective focal length of the imaging lens, T2 represents a thickness of said second lens element at the optical axis, T4 represents a thickness of said fourth lens element at the optical axis, ALT represents a sum of thicknesses of said first lens element, said second lens element, said third lens element, and said fourth lens element at the optical axis, Gaa represents a sum of three air gap lengths at the optical axis among said first lens element, said second lens element, said third lens element, and said fourth lens element, and G23 represents the air gap length between said second lens element and said third lens element at the optical axis;

said imaging lens further satisfies $TTL/T3 \ge 7$, where TTL represents a distance at the optical axis between said object-side surface of said first lens element and an image plane, and T3 represents the thickness of said third lens element at the optical axis; and said imaging lens does not include any lens element with refractive power other than said first lens element, said second lens element, said third lens element, and said fourth lens element.

2. The imaging lens as claimed in claim 1, further satisfying $Gaa/G23 \le 2.8$.

3. The imaging lens as claimed in claim 2, further satisfying $BFL/T2 \ge 4.6$, where BFL represents a distance at the optical axis between said image-side surface of said fourth lens element and an image plane.

4. The imaging lens as claimed in claim 2, further satisfying $T3/(G12+G34) \ge 1.9$, where T3 represents the thickness of said third lens element at the optical axis, G12 represents the air gap length between said first lens element and said second lens element at the optical axis, and G34 represents the air gap length between said third lens element and said fourth lens element at the optical axis.

5. The imaging lens as claimed in claim 4, wherein said object-side surface of said fourth lens element further has a concave portion in a vicinity of the periphery of said fourth lens element.

6. The imaging lens as claimed in claim 1, further satisfying $EFL/T3 \le 6.5$, where T3 represents the thickness of said third lens element at the optical axis.

7. The imaging lens as claimed in claim 6, further satisfying $T3/G23 \le 1.9$.

8. The imaging lens as claimed in claim 6, further satisfying $Gaa/(G12+G34) \ge 2.1$, where G12 represents the air gap length between said first lens element and said second lens element at the optical axis, and G34 represents the air gap length between said third lens element and said fourth lens element at the optical axis.

9. The imaging lens as claimed in claim 1, further satisfying $ALT/T4 \le 4.2$.

10. The imaging lens as claimed in claim 1, further satisfying $T1/G23 \le 2.5$, where T1 represents the thickness of said first lens element at the optical axis.

11. The imaging lens as claimed in claim 10, further satisfying $ALT/T3 \ge 3.6$, where T3 represents the thickness of said third lens element at the optical axis.

12. The imaging lens as claimed in claim 10, further satisfying $BFL/T3 \ge 2.65$, where BFL represents a distance at the optical axis between said image-side surface of said fourth lens element and an image plane, and T3 represents the thickness of said third lens element at the optical axis.

13. The imaging lens as claimed in claim 1, further satisfying $TTL/T1 \le 7.15$, where T1 represents the thickness of said first lens element at the optical axis.

14. The imaging lens as claimed in claim 13, further satisfying $ALT/T3 \ge 3.55$, where T3 represents the thickness of said third lens element at the optical axis.

15. The imaging lens as claimed in claim 14, further satisfying $TTL/T4 \le 9.1$.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

17. An imaging lens comprising an aperture stop, a first lens element, a second lens element, a third lens element, and a fourth lens element arranged in order from an object side to an image side along an optical axis of said imaging lens, each of said first lens element, said second lens element, said third lens element, and said fourth lens element having a refractive power, an object-side surface facing toward the object side, and an image-side surface facing toward the image side, wherein:

said first lens element has a positive refractive power, and said image-side surface of said first lens element has a convex portion in a vicinity of the optical axis and a convex portion in a vicinity of a periphery of said first lens element;

said second lens element has a negative refractive power, and said object-side surface of said second lens element has a concave portion in a vicinity of the optical axis and a concave portion in a vicinity of a periphery of said second lens element, and said image side-surface of said second lens element has a convex portion in a vicinity of a periphery of said second lens element;

said third lens element has a positive refractive power, said object-side surface of said third lens element has a concave portion in a vicinity of the optical axis and a concave portion in a vicinity of a periphery of said third lens element, and said image-side surface of said third lens element has a convex portion in a vicinity of the optical axis;

said fourth lens element has a negative refractive power and is made of a plastic material, said object-side surface of said fourth lens element has a convex portion in a vicinity of the optical axis, and said image-side surface of said fourth lens element has a convex portion in a vicinity of a periphery of said fourth lens element;

said imaging lens satisfies $6 \leq EFL/T2 \leq 11$; $4 \leq ALT/G23 \leq 18$; $1.4 \leq Gaa/T2 \leq 2.11$; $5 \leq ALT/T2 \leq 7.2$; and $T4/G23 \geq 1$, where EFL represents a system effective focal length of the imaging lens, T2 represents a thickness of said second lens element at the optical axis, T4 represents a thickness of said fourth lens element at the optical axis, ALT represents a sum of thicknesses of said first lens element, said second lens element, said third lens element, and said fourth lens element at the optical axis, Gaa represents a sum of three air gap lengths at the optical axis among said first lens element, said second lens element, said third lens element, and said fourth lens element, and G23 represents the air gap length between said second lens element and said third lens element at the optical axis;

said imaging lens further satisfies $TTL/T1 \leq 7.15$, where T1 represents the thickness of said first lens element at the optical axis, and TTL represents a distance at the optical axis between said object-side surface of said first lens element and an image plane; and said imaging lens does not include any lens element with refractive power other than said first lens element, said second lens element, said third lens element, and said fourth lens element.

* * * * *